(12) United States Patent
Langadi et al.

(10) Patent No.: US 12,032,440 B2
(45) Date of Patent: Jul. 9, 2024

(54) METHODS, APPARATUS, AND ARTICLES OF MANUFACTURE TO DETERMINE MEMORY ACCESS INTEGRITY BASED ON FEEDBACK FROM MEMORY

(71) Applicant: Texas Instruments Incorporated, Dallas, TX (US)

(72) Inventors: Saya Goud Langadi, Bangalore (IN); David Peter Foley, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/866,659

(22) Filed: Jul. 18, 2022

(65) Prior Publication Data

US 2022/0350699 A1   Nov. 3, 2022

Related U.S. Application Data

(63) Continuation of application No. 17/187,492, filed on Feb. 26, 2021, now Pat. No. 11,392,455.

(51) Int. Cl.
*G11C 29/00* (2006.01)
*G06F 11/07* (2006.01)
(Continued)

(52) U.S. Cl.
CPC ...... *G06F 11/1068* (2013.01); *G06F 11/0772* (2013.01); *G06F 11/3037* (2013.01); *G06F 13/1631* (2013.01); *G06F 13/1668* (2013.01)

(58) Field of Classification Search
CPC ............ G06F 11/1068; G06F 11/0772; G06F 11/3037; G06F 13/1631; G06F 13/1668
See application file for complete search history.

(56) References Cited

U.S. PATENT DOCUMENTS 5,345,582 A   9/1994   Tsuchiya
5,392,302 A   2/1995   Kemp et al.
(Continued)

OTHER PUBLICATIONS

Wikipedia, "Arbiter (electronics)," last edited on May 29, 2020, available online: https://en.wikipedia.org/w/index.php?title=Arbiter_(electronics)&oldid=959513879, last retrieved Dec. 1, 2020 (4 pages).

(Continued)

*Primary Examiner* — Samir W Rizk
(74) *Attorney, Agent, or Firm* — Brian D. Graham; Frank D. Cimino

(57) ABSTRACT

Methods, apparatus, systems, and articles of manufacture are disclosed to determine memory access integrity based on feedback from memory. An example apparatus includes an access reconstruction controller including an output, a first input configured to be coupled to memory, and a second input configured to be coupled to a memory signal generator; a comparator including a first input coupled to the output of the access reconstruction controller, a second input configured to be coupled to an arbiter, and an output configured to be coupled to the arbiter; and a data integrity monitor including an input coupled to the second input of the comparator and configured to be coupled to the arbiter and an output coupled to the output of the comparator and configured to be coupled to the arbiter.

19 Claims, 7 Drawing Sheets

(51) Int. Cl.
*G06F 11/10* (2006.01)
*G06F 11/30* (2006.01)
*G06F 13/16* (2006.01)

(56) References Cited

U.S. PATENT DOCUMENTS

| | | | |
|---|---|---|---|
| 5,537,425 | A | 7/1996 | Tsou |
| 6,055,611 | A * | 4/2000 | Wright .................. G11C 29/78 711/105 |
| 7,345,582 | B2 | 3/2008 | Gould |
| 7,380,200 | B2 | 5/2008 | Dent |
| 2005/0149839 | A1 * | 7/2005 | Dent ................. H03M 13/2915 714/E11.049 |
| 2009/0228770 | A1 | 9/2009 | Lin et al. |
| 2009/0282305 | A1 * | 11/2009 | Chen ...................... G11C 29/42 714/E11.159 |
| 2014/0331110 | A1 | 6/2014 | Hwang et al. |
| 2018/0121274 | A1 | 5/2018 | Speier et al. |
| 2019/0018732 | A1 * | 1/2019 | Ryu .................... G06F 11/1068 |

OTHER PUBLICATIONS

Wikipedia, "Direct memory access," last edited on Nov. 25, 2020, available online: https://en.wikipedia.org/w/index.php?title=Direct_memory_access&oldid=990674236, last retrieved Dec. 1, 2020 (10 pages).

Wikipedia, "Error correction code," last edited on Nov. 29, 2020, available online: https://en.wikipedia.org/w/index.php?title=Error_correction_code&oldid=991313625, last retrieved Dec. 20, 2020 (14 pages).

Wikipedia, "Memory controller," last edited on Dec. 1, 2020, available online: https://en.wikipedia.org/w/index.php?title=Memory_controller&oldid=991788092, last retrieved Dec. 1, 2020 (5 pages).

Veena Kamath, Prasanth Viswanathan Pillai, Sira Rao, and Baskaran Chidambaram, "CRC Engines in C2000™ Devices," Application Report SPRACR3—Apr. 2020, Texas Instruments (8 pages).

Texas Instruments, "TMS320C54x DSP Functional Overview," Sep. 1998—Revised May 2000 (52 pages).

Texas Instruments, "TMS320F28002x Real-Time Microcontrollers," Mar. 2020—Revised Oct. 2020 (196 pages).

Wikipedia, "Address decoder," last edited on Dec. 17, 2019, available online: https://en.wikipedia.org/w/index.php?title=Address_decoder&oldid=931232546, last retrieved Dec. 29, 2020 (1 pages).

Matt James, "Address Decoding," Digital Systems & Microprocessors, V1.2, Department of Engineering Australian National University, available online: users.cecs.anu.edu.au/~Matthew.James/engn3213-2002/notes/busnode5.html, last retrieved Dec. 29, 2020 (3 pages).

"Memory Address Decoding," available online: https://ece-research.unm.edu/jimp/310/slides/8086_memory2.html, last retrieved Dec. 29, 2020 (17 pages).

Wikipedia, "Memory cell (computing)," last edited on Dec. 5, 2020, available online: https://en.wikipedia.org/w/index.php?title=Memory_cell_(computing)&oldid=992468660, last retrieved Dec. 29, 2020 (11 pages).

Patent Cooperation Treaty, "International Search Report," issued in connection with Application No. PCT/US2019/054784, Jan. 23, 2020, 2 pages.

Patent Cooperation Treaty, "Written Opinion," issued in connection with Application No. PCT/US2019/054784, Jan. 23, 2020, 4 pages.

Thomas Jew, "Embedded Memory Design—Memories Differentiate Microcontroller Solutions", VLSI Technology Symposium, 2017, 41 pages.

United States Patent and Trademark Office, "Non-Final Office Action", issued in connection with U.S. Appl. No. 16/153,546, filed May 19, 2020, (28 pages).

United States Patent and Trademark Office, "Final Office Action", issued in connection with U.S. Appl. No. 16/153,546, filed Nov. 19, 2020, (37 pages).

IBM Technical Disclosure Bulletin, Array Initialization With Address Fault Checking, (Jul. 1979), (3 pages).

* cited by examiner

METHODS, APPARATUS, AND ARTICLES OF MANUFACTURE TO DETERMINE MEMORY ACCESS INTEGRITY BASED ON FEEDBACK FROM MEMORY

CROSS-REFERENCE TO RELATED APPLICATIONS

This application is a continuation of U.S. patent application Ser. No. 17/187,492, filed Feb. 26, 2021, which is incorporated by reference herein in its entirety.

FIELD OF THE DISCLOSURE

This disclosure relates generally to determining memory access integrity, and, more particularly, to methods, apparatus, and articles of manufacture to determine memory access integrity based on feedback from memory.

BACKGROUND

Manufacturers of integrated circuits (ICs) have developed techniques to manufacture compact ICs that incorporate components of a computer and/or other electronic system. Such ICs are referred to as Systems on a Chip, or SoCs. Often, such SoCs include central processing units (CPUs), memory, input/output ports, and secondary storage, all on the same substrate. The memory and/or secondary storage may be implemented by random access memory (RAM), ferroelectric random-access memory (FRAM), non-exclusive OR (NOR) flash, one-time programmable read only memory (OTP ROM), among others. SoCs may be configured to act as microcontrollers which are useful for processes that can be written into a coded set of instructions that can be executed to carry out the desired process in an automated fashion.

Figure 1:
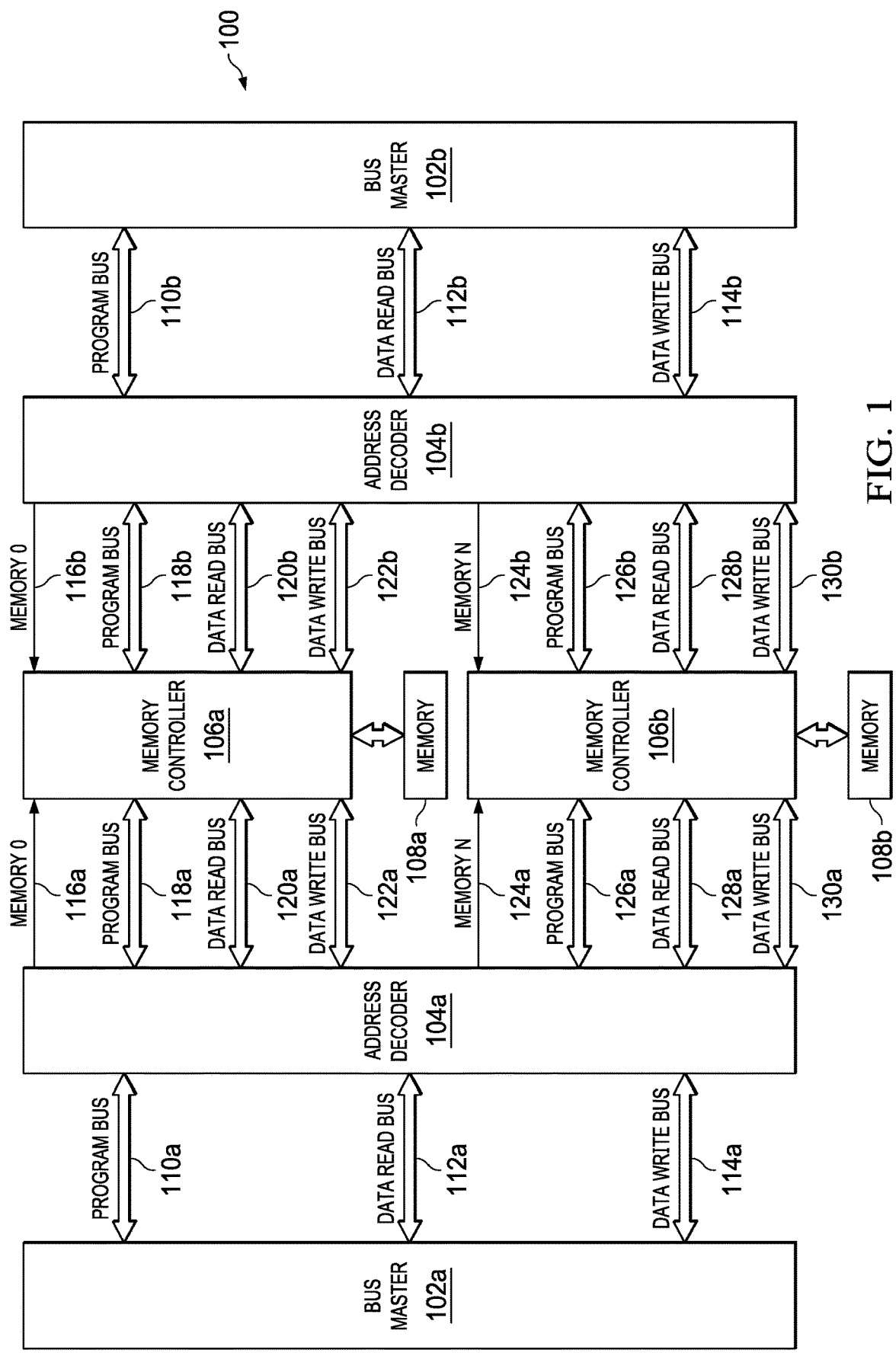
FIG. 1 is a block diagram illustrating an example SoC including one or more example bus masters, one or more example address decoders, and one or more example memory controllers.

The figures are not to scale. In general, the same reference numbers will be used throughout the drawing(s) and accompanying written description to refer to the same or like parts. As used herein, connection references (e.g., attached, coupled, connected, and joined) are to be construed in light of the specification and, when pertinent, the surrounding claim language. Construction of connection references in the present application shall be consistent with the claim language and the context of the specification which describes the purpose for which various elements are connected. As such, connection references do not necessarily infer that two elements are directly connected and in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

SUMMARY

Certain examples disclosed herein provide end-to-end integrity for memory and interconnecting circuitry. An example apparatus includes an access reconstruction controller, a comparator, and a data integrity monitor. The access reconstruction controller includes an output, a first input configured to be coupled to memory, and a second input configured to be coupled to a memory signal generator. The comparator includes a first input coupled to the output of the access reconstruction controller, a second input configured to be coupled to an arbiter, and an output configured to be coupled to the arbiter. The data integrity monitor includes an input coupled to the second input of the comparator and configured to be coupled to the arbiter and an output coupled to the output of the comparator and configured to be coupled to the arbiter.

An example system includes memory and a memory controller. The memory includes an input and output and the memory is configured to generate one or more feedback signals. The memory controller includes a first input configured to be coupled to an address decoder, a second input coupled to the output of the memory, and an output coupled to the input of the memory. The memory controller is configured to receive the one or more feedback signals from the memory and reconstruct, based on the one or more feedback signals, access and control (AAC) information utilized to access the memory. The memory controller is also configured to compare the reconstructed AAC information to AAC information expected based on a request to access the memory. The memory controller is configured to compare a base address of the memory to an expected base address received in the expected AAC information. The memory controller is configured to, in response to detecting at least one of a difference between the reconstructed AAC information and the expected AAC information or a difference between the base address of the memory and the expected base address, generate an interrupt.

An example method includes reconstructing, based on one or more feedback signals from memory of a system on a chip (SoC), access and control (AAC) information utilized to access the memory. The method also includes comparing the reconstructed AAC information to AAC information expected based on a request from a bus master of the SoC to access the memory. The method additionally includes comparing a base address of the memory to an expected base address received in the expected AAC information. The method includes, in response to detecting at least one of a difference between the reconstructed AAC information and the expected AAC information or a difference between the base address of the memory and the expected base address, transmitting an interrupt to the bus master.

DETAILED DESCRIPTION

SoCs may be implemented in many use-cases. For example, SoCs are implemented in vehicle systems, biomedical devices, remote controllers, appliances, and/or electric power tools, among others. Depending on the application, the SoC may include digital, analog, mixed-signal, radio frequency (RF), and/or other signal processing functions. For example, an SoC may include one or more CPUs and/or one or more accelerators. As such, many SoCs include direct memory access (DMA) controllers to regulate CPU and/or accelerator access to memory. The ability to regulate various processes by controlling the passage of data between processor(s) and memory makes SoCs desirable for automated systems.

SoCs may be subjected to one or more safety standards. For example, the Automotive Safety Integrity Level (ASIL) is a risk classification scheme defined by the International Organization for Standardization (ISO) 26262 standard. The ASIL scheme specifies functional safety for road vehicles and as such, SoCs in vehicles may be evaluated based on the ASIL scheme. The ASIL scheme includes four levels: ASIL A, ASIL B, ASIL C, and ASIL D. The ASIL D level specifies the highest level of safety measures in the ISO 26262 standard to avoid unreasonable residual risk.

Generally, SoCs include one or more bus masters, one or more address decoders, one or more memory controllers, and/or one or more memories. Bus masters may access one or more of the memories by transmitting an address, data to write to memory, and/or a request to read and/or write to memory to an address decoder. The address decoder determines which of the one or more memories to access based on the information received from the bus master and forwards the information to the corresponding memory controller(s). The memory controller arbitrates requests from the one or more bus masters to access the corresponding memory and generates signals to access the memory.

To comply with safety standards (e.g., ASIL), SoCs protect memory bits from faults via error correcting code (ECC) and/or parity. Some SoCs duplicate address decoders and compare the outputs of corresponding address decoders to check for faults (referred to interchangeably as "errors"). Many SoCs compute ECC and/or parity based on data and/or addresses where the data is stored. Additionally, SoCs protect buses via parity and/or ECC. For example, the memory controller checks address and/or control signals received from bus masters for errors. SoCs may store address ECC to detect errors that occur when the memory address is accessed.

Some SoCs perform data and/or address integrity checks to monitor for various types of faults (e.g., errors) such as: faults at address decoders, faults in address and/or control information, and faults when writing to and/or reading from one or more bit-cells within memory. However, hardware to perform these checks in SoCs may increase the physical area consumed by SoCs, impacting cost of business. Additionally, to perform these checks SoCs create timing issues that may impact the frequency of operation of SoCs.

Faults at address decoders may result in memory access being routed to an incorrect memory and/or the loss of some or all of the memory access. To handle faults at address decoders, some SoCs duplicate address decoders and compare the outputs of corresponding address decoders to check for faults. Thus, to check for faults at address decoders, SoCs increase the physical area consumption of SoCs while also affecting timing of operations executed by SoCs.

Faults in address, data, and control information may result in writing to an incorrect memory location. For example, faults in address, data, and control information may result in writing to 8-bits of memory when a write to 4-bits was requested (or vice versa). To handle faults in address, data, and control information, bus masters transmit sideband signals to downstream devices. The sideband signals include ECC and/or parity code for the address and/or control signals. In this manner, downstream devices (e.g., address decoders, memory controllers, etc.) can check for and/or correct errors in the address, data, and control information.

Faults when writing to and/or reading from one or more bit-cells within memory may result in writing to and/or reading from an unintended location. To handle faults when writing to and/or reading from one or more bit-cells, some SoCs generate ECC and/or parity code for data and the address at which data is to be stored. These SoCs store the ECC code in memory as a combination of the data and the address where data is to be stored. When reading from memory, these SoCs can detect errors by distilling the data and address where the data was to be stored. Some SoCs only store ECC and/or parity code for the address where data is to be stored. However, to handle faults when writing to and/or reading from one or more bit-cells, these SoCs require additional inputs (e.g., to support address values) to ECC and/or parity logic. Additionally, to handle faults when writing to and/or reading from one or more bit-cells, these SoCs require additional ECC bits for every memory word and/or address.

While some SoCs monitor for faults at address decoders, faults in address and/or control information, and faults when writing to and/or reading from one or more bit-cells within memory, these SoCs do not address other faults, preventing the SoCs from meeting higher safety standards (e.g., ASIL D). Additionally, the techniques to check for faults at address decoders, faults in address and/or control information, and faults when writing to and/or reading from one or more bit-cells within memory increase the physical area consumed by SoCs, impacting cost of business when using current SoCs. Additionally, the techniques to check for faults at address decoders, faults in address and/or control information, and faults when writing to and/or reading from one or more bit-cells within memory create timing issues that impact the frequency of operation of SoCs. To satisfy higher safety standards (e.g., ASIL D), SoCs should detect and/or correct for errors occurring anywhere between the bus master, the address decoder, the memory controller, and the memory.

Advantageously, examples disclosed herein include end-to-end coverage for memory interconnects in SoCs. Examples disclosed herein include memory that generates feedback after and/or while the memory is accessed. Example memory disclosed herein generates signals specifying at least the address that was actually accessed in memory, the data written to memory, if any, the size of the data written to memory, if any, whether access to the memory was enabled, and whether a read or a write is being and/or was performed. Based on the feedback from memory, examples disclosed herein interpret the memory location(s) accessed, the data written to memory, the size of the data written to memory, and/or whether a read or write operation was performed on memory to compare to similar values retrieved from a bus master.

Additionally, examples disclosed herein perform additional data and/or address integrity checks while also performing data and/or address integrity checks more efficiently than previous techniques (e.g., with respect to area consumption and/or frequency of operation of the SoC). For example, the disclosed methods, apparatus, and articles of manufacture perform a base address check that detects address decode faults in forward paths (e.g., downstream). Examples disclosed herein also perform an acknowledgement check to determine whether a complete loss of access has occurred. Examples disclosed herein simultaneously achieve improved data and/or access integrity, while also decreasing physical area consumption of SoCs, enabling higher frequency operation of SoCs. Accordingly, examples disclosed herein enable next generation architecture SoCs that satisfy higher level safety standards (e.g., ASIL D).

FIG. 1 is a block diagram illustrating an example SoC 100 including one or more example bus masters 102, one or more example address decoders 104, one or more example memory controllers 106, and one or more example memories 108. For example, the SoC 100 includes an example first bus master 102a, an example second bus master 102b, an example first address decoder 104a, an example second address decoder 104b, an example first memory controller 106a, an example second memory controller 106b, an example first memory 108a, and an example second memory 108b. In the example of FIG. 1, the first bus master 102a includes dual purpose terminals (e.g., input and/or output terminals). As used herein, the term dual purpose terminal refers to a terminal that includes two purposes. For example, dual purpose terminals can operate as both an input terminal and an output terminal. In the example of FIG. 1, the first address decoder 104a includes first dual purpose terminals, second dual purpose terminals, third dual purpose terminals, first output terminals, and second output terminals. In the example of FIG. 1, the first memory controller 106a includes first dual purpose terminals, second dual purpose terminals, first input terminals, second input terminals, third input terminals, and output terminals. In the example of FIG. 1, the first memory 108a includes input terminals and output terminals. As used herein, the term dual purpose terminal may be substituted for input terminal and/or output terminal depending on whether the device including the dual purpose terminal is transmitting or receiving data. Additionally, in some examples, terminal may be omitted from the terms input terminal, output terminal, and dual purpose terminal.

In the illustrated example of FIG. 1, the dual purpose terminals of the first bus master 102a are coupled to the first dual purpose terminals of the first address decoder 104a via an example program bus 110a, an example data read bus 112a, and an example data write bus 114a. In the example of FIG. 1, the first output terminals of the first address decoder 104a are coupled to the first input terminals of the first memory controller 106a via an example first memory request channel 116a. In the example of FIG. 1, the second dual purpose terminals of the first address decoder 104a are coupled to the first dual purpose terminals of the first memory controller 106a via an example first memory program bus 118a, an example first memory data read bus 120a, and an example first memory data write bus 122a. The second output terminals of the first address decoder 104a are coupled to the first input terminals of the second memory controller 106b via an example second memory request channel 124a. The third dual purpose terminals of the first address decoder 104a are coupled to the first dual purpose terminals of the second memory controller 106b via an example second memory program bus 126a, an example second memory data read bus 128a, and an example second memory data write bus 130a. The output terminals of the first memory controller 106a are coupled to the first memory 108a via an example bus. The third input terminals of the first memory controller 106a are coupled to the output terminals of the first memory 108a via an example bus.

In the illustrated example of FIG. 1, the first bus master 102a is implemented by a CPU. In alternative examples, the first bus master 102a may be implemented by one or more accelerators such as one or more control law accelerators (CLAs), one or more floating-point units (FPUs), one or more fast integer division (FINTDIV) units, one or more trigonometric math units (TMUs), one or more Viterbi, complex math and cyclic redundancy check (CRC) units (VCUs), one or more background CRC (BGCRC) units, and/or one or more Ethernet media access controllers (EMACs), among others. In some examples, the first bus master 102a is implemented by one or more DMA controllers. In the example of FIG. 1, the first bus master 102a executes one or more programs and/or instructions according to a use-case in which the SoC 100 is implemented. Based on the program(s) and/or instruction(s) executed by the first bus master 102a, the first bus master 102a accesses the first memory 108a and/or the second memory 108b (e.g., via the first address decoder 104a, the first memory controller 106a, and/or the second memory controller 106b). In the example of FIG. 1, when the first bus master 102a request access to one or more of the first memory 108a or the second memory 108b, the first bus master 102a performs one or more acknowledgement checks to confirm that the requested memory access was performed by the first memory controller 106a or the second memory controller 106b.

In some examples, the example first bus master 102a implements example means for executing operations. The means for executing operations is implemented by executable instructions such as that implemented by at least blocks 802, 804, 806, 808, and 810 of FIG. 8. The executable instructions of blocks 802, 804, 806, 808, and 810 of FIG. 8 may be executed on at least one processor such as the example processor 912 and/or the accelerator 936 of FIG. 9. In other examples, the means for executing operations is implemented by hardware logic, hardware implemented state machines, logic circuitry, and/or any other combination of hardware, software, and/or firmware.

In the illustrated example of FIG. 1, the first address decoder 104a is implemented by logic (e.g., sequential logic and/or combinational logic). In additional or alternative examples, the first address decoder 104a may be implemented by hardware, firmware, and/or software. In the example of FIG. 1, the first address decoder 104a routes address and/or control information (e.g., memory address (es), data to be written, etc.) to the first memory controller 106a and/or the second memory controller 106b. For example, each of the first memory 108a and the second memory 108b may include a base address according to a memory map of the SoC 100 and individual memory cells within the first memory 108a and/or the second memory 108b may be accessed via an offset address to the respective base addresses. In the example of FIG. 1, the first address decoder 104a determines the base address of the requested memory based on the information transmitted to the first address decoder 104a on the program bus 110a, the data read bus 112a, and/or the data write bus 114a.

In the illustrated example of FIG. 1, the first memory controller 106a is implemented by logic (e.g., sequential logic and/or combinational logic). In additional or alternative examples, the first memory controller 106a is implemented by an integrated memory controller (IMC), a memory chip controller (MCC), a memory controller unit (MCU), and/or a memory management unit (MMU), among others. In the example of FIG. 1, the first memory controller 106a controls when and which devices (e.g., the first bus master 102a and/or the second bus master 102b) accesses the first memory 108a. For example, when one or more of the first bus master 102a or the second bus master 102b request control of the buses (e.g., the first memory program buses 118, the first memory data read buses 120, the example first memory data write buses 122), the first bus master 102a and/or the second bus master 102b may request access via the first memory request channel 116a and/or the first memory request channel 116b, respectively.

In the illustrated example of FIG. 1, the first memory controller 106a arbitrates requests from devices and generates signals to access the first memory 108a. For example, the first memory controller 106a determines which of the devices (e.g., the first bus master 102a or the second bus master 102b) can access the buses based on the priority of one or more devices, the fairness of serving the requesting devices with respect to other devices, and/or whether the buses are currently in use. The first memory controller 106a can employ daisy chain, polling, and/or independent requests to serve connected devices.

In the illustrated example of FIG. 1, after arbitrating which of the devices is to access the first memory 108a, the first memory controller 106a generates one or more signals to access the first memory 108a. For example, the first memory controller 106a may enable access to the first memory 108a via a memory enable signal. Additionally, the first memory controller 106a may access the first memory 108a via an offset address to a base address of the first memory 108a. For example, the base address is hardcoded at the first memory controller 106a to enable data integrity checks disclosed herein. After accessing the first memory 108a, the first memory controller 106a monitors the first memory 108a for one or more feedback signals. Based on the one or more feedback signals from the first memory 108a, the first memory controller 106a check for errors in the memory access. For example, the first memory controller 106a recreates the memory access (e.g., a memory enable signal, the address accessed in memory, a write enable signal indicating whether a read or write occurred, the data written, the size of the data written, etc.), checks that the first memory 108a matches the memory requested by the device, and performs ECC and/or parity checks on the data and/or address received from the first bus master 102a and/or the second bus master 102b. For example, the first memory controller 106a recreates the access to the first memory 108a based on feedback signals from the first memory 108a including a memory enable signal, an offset address at which data that was operated on is stored, a write enable signal indicating whether a read or write occurred, byte enable signals, and/or the data written to memory. For example, to recreate the address accessed, the first memory controller 106a adds the offset address to a base address of the first memory 108a that is hardcoded at the first memory controller 106a. For example, each of the first memory 108a and the second memory 108b include a base address according to a memory map of the SoC 100 and individual memory cells within the first memory 108a and/or the second memory 108b may be accessed by energizing respective word-lines and bit-lines according to an offset address received from a requesting bus master. The offset address used to recreate the address access is recreated in the first memory 108a based on the word-lines and bit-lines that are energized in the first memory 108a during the access. Additional detail of error checking is discussed further herein.

In some examples, the example first memory controller 106a implements example means for accessing memory. The means for accessing memory is implemented by executable instructions such as that implemented by at least blocks 502, 504, 506, 508, 510, 512, 514, 516, 518, and 520 of FIG. 5, at least blocks 602, 604, 606, 608, 610, 612, 614, 616, and 618 of FIG. 6, and/or at least blocks 702, 704, 706, and 708 of FIG. 7. The executable instructions of blocks 502, 504, 506, 508, 510, 512, 514, 516, 518, and 520 of FIG. 5, blocks 602, 604, 606, 608, 610, 612, 614, 616, and 618 of FIG. 6, and/or blocks 702, 704, 706, and 708 of FIG. 7 may be executed on at least one processor such as the example memory controller 934 of FIG. 9. In other examples, the means for accessing memory is implemented by hardware logic, hardware implemented state machines, logic circuitry, and/or any other combination of hardware, software, and/or firmware.

In the illustrated example of FIG. 1, the first memory 108a is implemented by a memory storage array such as a programmable logic array, field programmable gate array, among others. For example, the first memory 108a may be implemented as a dynamic RAM (DRAM), static RAM (SRAM), hard drive, etc. The first memory 108a includes word-lines and bit-lines that operate as designators for row-column pairs. The first memory controller 106a selects specific address information in the first memory 108a to read and/or write data based on information received from the first address decoder 104a and/or the second address decoder 104b.

In the illustrated example of FIG. 1, the first memory 108a is DRAM and as such includes several switches and capacitors. The switches may be transistors such as metal oxide semiconductor field effect transistors (MOSFET), bipolar junction transistors (BJT), junction gate field effect transistors (JFET), heterojunction bipolar transistors (HBT), etc. The usage of a transistor and capacitor together forms a memory cell which corresponds to a single bit of data. The word-lines and bit-lines of the first memory 108a specify the location of individual memory cells from which to read and/or in which to store data. In the illustrated example of FIG. 1, the first memory 108a is configured to generate one or more feedback signals to enable increased data integrity. For example, the first memory 108a is configured to encode the word-lines and bit-lines energized during access to the first memory 108a into a recreated offset address.

In the illustrated example of FIG. 1, the program bus 110a may be implemented using any suitable hardware (e.g., wire, optical fiber, etc.) and/or software (e.g., communication protocols, etc.) communication technique to transmit instructions, addresses, and/or operands to the first memory 108a. The program bus 110a additionally transmits sideband ECC and/or parity code for address, data, and control information. In the example of FIG. 1, the first memory program bus 118a and the second memory program bus 126a may be implemented using any suitable hardware (e.g., wire, optical fiber, etc.) and/or software (e.g., communication protocols, etc.) communication technique to transmit information on the program bus 110a between the first memory 108a or the second memory 108b, respectively, and the requesting bus master.

In the illustrated example of FIG. 1, the data read bus 112a may be implemented using any suitable hardware (e.g., wire, optical fiber, etc.) and/or software (e.g., communication protocols, etc.) communication technique to transmit operands read from the first memory 108a and/or the second memory 108b and/or corresponding addresses. The data read bus 112a additionally transmits sideband ECC and/or parity code for address, data, and control information. In the example of FIG. 1, the first memory data read bus 120a and the second memory data read bus 128a may be implemented using any suitable hardware (e.g., wire, optical fiber, etc.) and/or software (e.g., communication protocols, etc.) communication technique to transmit information on the data read bus 112a between the first memory 108a or the second memory 108b, respectively, and the requesting bus master.

In the illustrated example of FIG. 1, the data write bus 114a may be implemented using any suitable hardware (e.g., wire, optical fiber, etc.) and/or software (e.g., communication protocols, etc.) communication technique to transmit data to be written to the first memory 108a and/or the second memory 108b and/or corresponding addresses. The data write bus 114a additionally transmits sideband ECC and/or parity code for address, data, and control information. In the example of FIG. 1, the first memory data write bus 122a, and the second memory data write bus 130a may be implemented using any suitable hardware (e.g., wire, optical fiber, etc.) and/or software (e.g., communication protocols, etc.) communication technique to transmit information on the data write bus 114a between the first memory 108a or the second memory 108b, respectively, and the requesting bus master. In examples disclosed herein, the information transmitted on the program bus 110a, the data read bus 112a, and/or the data write bus 114a may be referred to collectively as access and control (AAC) information.

In examples disclosed herein, the bus masters 102 transmit sideband ECC and/or parity code for address, data, and control information on the program buses 110, the data read buses 112, and the data write buses 114 to enable the memory controllers 106 to detect and/or correct errors that occur in transit between the bus masters 102 and the memory controllers 106 (e.g., faults occurring between a bus master and address decoder). Other techniques for data integrity generate ECC and/or parity bits at memory controllers and store the ECC and/or parity bits for the address with the data that is stored in memory. Additionally, these other techniques only check for errors during read operations. As such, these other techniques do not detect errors occurring in the address, data, or control information before such information reaches the memory controller.

Contrary to these other techniques, by transmitting the ECC and/or parity code for address, data, and control information on the program buses 110, the data read buses 112, and the data write buses 114, examples disclosed herein enable the memory controllers 106 to detect faults occurring before the address, data, and control information reaches the memory controllers 106. Additionally, the example memory controllers 106 disclosed herein check for errors in address, data, and control information during read and/or write operations.

In the illustrated example of FIG. 1, the first memory request channel 116a may be implemented using any suitable hardware (e.g., wire, optical fiber, etc.) and/or software (e.g., communication protocols, etc.) communication technique to request access to the first memory 108a. In the example of FIG. 1, the second memory request channel 124a may be implemented using any suitable hardware (e.g., wire, optical fiber, etc.) and/or software (e.g., communication protocols, etc.) communication technique to request access to the second memory 108b.

Although the description of FIG. 1 is directed to the first bus master 102a, the first address decoder 104a, the first memory controller 106a, the first memory 108a, the program bus 110a, the data read bus 112a, the data write bus 114a, the first memory request channel 116a, the first memory program bus 118a, the first memory data read bus 120a, the first memory data write bus 122a, the second memory request channel 124a, the second memory program bus 126a, the second memory data read bus 128a, and the second memory data write bus 130a, the description of FIG. 1 is not limited thereto. For example, the description of the first bus master 102a, the first address decoder 104a, the first memory controller 106a, the first memory 108a, the program bus 110a, the data read bus 112a, the data write bus 114a, the first memory request channel 116a, the first memory program bus 118a, the first memory data read bus 120a, the first memory data write bus 122a, the second memory request channel 124a, the second memory program bus 126a, the second memory data read bus 128a, and the second memory data write bus 130a similarly applies to the second bus master 102b, the second address decoder 104b, the second memory controller 106b, the second memory 108b, the program bus 110b, the data read bus 112b, the data write bus 114b, the first memory request channel 116b, the first memory program bus 118b, the first memory data read bus 120b, the first memory data write bus 122b, the second memory request channel 124b, the second memory program bus 126b, the second memory data read bus 128b, and the second memory data write bus 130b. For example, description directed to the first bus master 102a may similarly be applied to second bus master 102b.

Figure 2:
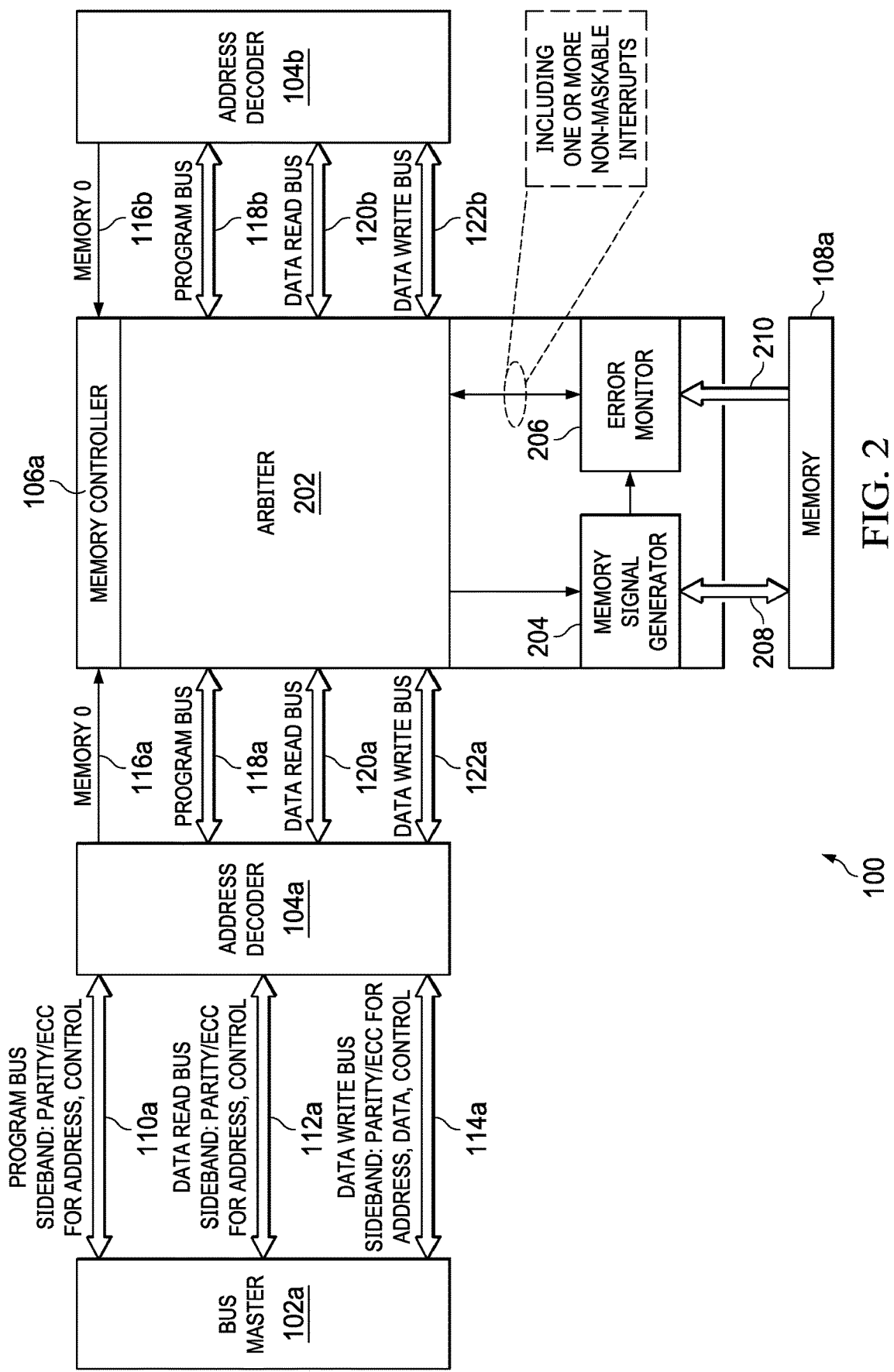
FIG. 2 is a block diagram showing additional detail of a first memory controller of FIG. 1.

FIG. 2 is a block diagram showing additional detail of a first memory controller 106a of FIG. 1. In the example of FIG. 2, the first memory controller 106a includes an example arbiter 202, an example memory signal generator 204, and an example error monitor 206. In the example of FIG. 2, the arbiter 202 includes first dual purpose terminals, second dual purpose terminals, first input terminals, second input terminals, first output terminals, second output terminals (not illustrated), and third input terminals (not illustrated). In the example of FIG. 2, the memory signal generator 204 includes input terminals, first output terminals, and second output terminals. In the example of FIG. 2, the error monitor 206 includes first input terminals, second input terminals, third input terminals (not illustrated), and output terminals (not illustrated).

In the illustrated example of FIG. 2, the first input terminals of the arbiter 202 are coupled to the first output terminals of the first address decoder 104a via the first memory request channel 116a. In the example of FIG. 2, the first dual purpose terminals of the arbiter 202 are coupled to the second dual purpose terminals of the first address decoder 104a via the first memory program bus 118a, the first memory data read bus 120a, and the first memory data write bus 122a. The second input terminals of the arbiter 202 are coupled to the first output terminals of the second address decoder 104b via the first memory request channel 116b. The second dual purpose terminals of the arbiter 202 are coupled to the second dual purpose terminals of the second address decoder 104b via the first memory program bus 118b, the first memory data read bus 120b, and the first memory data write bus 122b. In the example of FIG. 2, the first output terminals of the arbiter 202 are coupled to the input terminals of the memory signal generator 204 and the second output terminals of the arbiter 202 are coupled to the second input terminals of the error monitor 206. In the example of FIG. 2, the third input terminals of the arbiter 202 are coupled to the output terminals of the error monitor 206.

In the illustrated example of FIG. 2, the input terminals of the memory signal generator 204 are coupled to first output terminals of the arbiter 202. In the example of FIG. 2, the first output terminals of the memory signal generator 204 are coupled to the input terminals of the first memory 108a via an example memory access bus 208. In the example of FIG. 2, the second output terminals of the memory signal generator 204 are coupled to the third input terminals of the error monitor 206. In the example of FIG. 2, the first input terminals of the error monitor 206 are coupled to the output terminals of the first memory 108a via an example memory feedback bus 210. In the example of FIG. 2, the second input terminals of the error monitor 206 are coupled to the second output terminals of the arbiter 202. In the example of FIG. 2, the third input terminals of the error monitor 206 are coupled to the second output terminals of the memory signal generator 204. The output terminals of the error monitor 206 are coupled to the third input terminals of the arbiter 202.

In the illustrated example of FIG. 2, the arbiter 202 is implemented by logic (e.g., sequential logic and/or combinational logic). In additional or alternative examples, the arbiter 202 may be implemented by hardware, firmware, and/or software. In the example of FIG. 2, the arbiter 202 controls when and which devices (connected to the first memory controller 106a) can access the first memory 108a. The arbiter 202 employs at least one of daisy chain, polling, and/or independent requests arbitration techniques to serve connected devices. In the example of FIG. 2, the arbiter 202 is coupled to the memory signal generator 204 and the error monitor 206 via one or more wires (e.g., one or more buses). The arbiter 202 is also coupled to the first address decoder 104a and the second address decoder 104b via the first memory request channels 116, the first memory program buses 118, the first memory data read buses 120, and the first memory data write buses 122. In the example of FIG. 2, the arbiter 202 transmits the ECC and/or parity code on the first memory program bus 118a, the first memory data read bus 120a, and/or the first memory data write bus 122a to the error monitor 206.

In the illustrated example of FIG. 2, the memory signal generator 204 is implemented by logic, such as one or more multiplexers. In additional or alternative examples, the memory signal generator 204 may be implemented by hardware, firmware, and/or software. In the example of FIG. 2, the memory signal generator 204 translates the protocol by which the requesting bus master transmitted the address, data, and control information on the first memory program bus 118a, the first memory data read bus 120a, and/or the first memory data write bus 122a to the required protocol for the first memory 108a. For example, the memory signal generator 204 may translate protocols for the memory address and/or data via one or more physical logic gates and/or via Boolean algebra in software. Generally, the memory signal generator 204 does not alter the data received from the requesting bus master, but in some examples, the memory signal generator 204 omits some of the bits of the data, as described below.

In some examples, signal protocols for the first memory 108a may not match with the signal protocols of the requesting bus master. For example, the first memory 108a operates according to a memory enable signal that enables and/or disables access to the first memory 108a. In the example of FIG. 2, the requesting bus master does not transmit a memory enable signal, so the memory signal generator 204 generates the memory enable signal at memory level. Additionally, byte enable signals are not generated by the requesting bus master. Instead, the byte enable signals are generated by the memory signal generator 204. For example, the requesting bus master typically generates a 2-bit value specifying the size of the data on which to operate, but the first memory 108a may require byte enable signals ranging from 4-bit to 32-bit values.

Additionally or alternatively, whether the operation is a read or a write is not specified by the requesting bus master. Instead, the requesting bus master transmits general read operations over the data read buses 112 and program related data read operations over the program buses 110 while the requesting bus master transmits write operations over the data write buses 114. As such, the memory signal generator 204 generates a signal indicating whether a write operation is being performed.

In some examples, the requesting bus master may request a partial write operation. In such examples, if the memory word size is different than the size of the data to be operated on (e.g., sent by the requesting bus master), then the memory signal generator 204 does not include the bits of the address that do not match with the memory word size. In this manner, the memory signal generator 204 ignores some of the bits (e.g., the least significant bits (LSBs)) in the address. Similarly, the memory signal generator 204 ignores some of the bits (e.g., the LSBs) of the data that is to be written for partial write operations for data writes. For example, if the address and/or data size is 64 bits, the memory signal generator 204 ignores the last 3 bits of the address and/or data. Alternatively, if the address and/or data size is 32 bits, the memory signal generator 204 ignores the last 2 bits of the address and/or data. Accordingly, the bits ignored by the memory signal generator 204 are based on the minimum word size of data that the bus master can write to the memory and the word-size of the memory.

In the illustrated example of FIG. 2, after translating the bus master signal protocol to the memory signal protocol, the memory signal generator 204 energizes a memory enable signal and one or more word-lines and one or more bit-lines with the address. For example, the memory signal generator 204 energizes word-lines and/or bit-lines to access an address (e.g., one or more bit-cells within the first memory 108a) specified by a requesting device to write (e.g., store) and/or read data.

In the illustrated example of FIG. 2, for accesses to the first memory 108a including write operations, the memory signal generator 204 energizes a write enable signal. The write enable signal initiates a write to the first memory 108a. In the example of FIG. 2, the memory signal generator 204 additionally energizes one or more byte enable signals. In the example of FIG. 2, each byte enable signal initiates a write to 8 bits in the first memory 108a. For example, in some example, a memory location may be represented by 32 bits, but the requesting bus master may desire to read and/or write to less than 32 bits. In additional or alternative examples enable signals may correspond to different memory sizes (e.g., a bit enable signal, a nibble enable signal, a word enable signal, etc.). The energized memory enable signal, the one or more energized word-lines, the one or more energized bit-lines, the one or more energized byte enable signals, and/or the energized write enable signal collectively are referred to herein as memory access signals. The memory signal generator 204 transmits the memory access signals to the first memory 108a via the memory access bus 208.

In the illustrated example of FIG. 2, the error monitor 206 is implemented by logic (e.g., sequential logic and/or combinational logic). In additional or alternative examples, the error monitor 206 may be implemented by hardware, firmware, and/or software. In the example of FIG. 2, after the memory signal generator 204 transmits the memory access signals to the first memory 108a, the error monitor 206 reconstructs the memory access and control information based on one or more feedback signals transmitted on the memory feedback bus 210. For example, the first memory 108a transmits feedback signals including the memory enable signal, the offset address of the data being accessed in the first memory 108a, the data written to memory, the write enable signal indicating whether a write operation is being performed, and the byte enable signals that are being energized during the access to the first memory 108a. In some examples, the error monitor 206 reconstructs the memory access and control information based on the memory access signals transmitted over the memory access bus 208. In such examples, the first memory 108a stores address ECC and/or parity bits. For example, the error monitor 206 can detect address faults by monitoring the address ECC and/or parity bits. In this manner, the error monitor 206 detects errors up to the boundary of the first memory 108a. Additionally, to detect other faults in the first memory 108a, the first bus master 102a performs periodic diagnostic checks in software which satisfies higher safety standards (e.g., ASIL D).

In the illustrated example of FIG. 2, the error monitor 206 reconstructs the access and control information based on the feedback signals received from the first memory 108a. The error monitor 206 compares the reconstructed AAC information to the expected AAC information received from the requesting bus master (e.g., via the arbiter 202, the first address decoder 104a, and/or the second address decoder 104b). In response to detecting a difference between the reconstructed access and control information and the expected access and control information, the error monitor 206 generates a non-maskable interrupt to the bus master that requested access to the first memory 108a. In this manner, the error monitor 206 determines whether the expected access to the first memory 108a is being performed.

In the illustrated example of FIG. 2, if the error monitor 206 determines that the reconstructed access and control information matches the expected access and control information, the error monitor 206 compares the base address of the first memory 108a to the base address received from the first address decoder 104a. In response to detecting a difference between the base address of the first memory 108a to the base address received from the first address decoder 104a, the error monitor 206 generates a non-maskable interrupt to the bus master that requested access to the first memory 108a. In this manner, the error monitor 206 determines whether the current access reached the intended memory (e.g., for faults occurring at the address decoders 104).

In the illustrated example of FIG. 2, if the error monitor 206 determines that the base address of the first memory 108a matches the base address received from the first address decoder 104a, the error monitor 206 checks the ECC and/or parity code for the expected access and control information. In this manner, the error monitor 206 determines whether the address, data, and control information was corrupted in transit to the first memory controller 106a. If the error monitor 206 detects and error in the expected access and control information, the error monitor 206 generates a non-maskable interrupt to the bus master that requested access to the first memory 108a. If the error monitor 206 determines that no errors are present with respect to the ECC and/or parity code for the expected access and control information, the error monitor 206 transmits an acknowledgement to the bus master (e.g., via the arbiter 202, the first address decoder 104a, and/or the second address decoder 104b) that requested access to the first memory 108a.

In some examples, the example error monitor 206 implements example means for detecting errors. The means for detecting errors is implemented by executable instructions such as that implemented by at least blocks 502, 504, 506, 508, 510, 512, 514, 516, 518, and 520 of FIG. 5, at least blocks 602, 604, 606, 608, 610, 612, 614, 616, and 618 of FIG. 6, and/or at least blocks 702, 704, 706, and 708 of FIG. 7. The executable instructions of blocks 502, 504, 506, 508, 510, 512, 514, 516, 518, and 520 of FIG. 5, blocks 602, 604, 606, 608, 610, 612, 614, 616, and 618 of FIG. 6, and/or blocks 702, 704, 706, and 708 of FIG. 7 may be executed on at least one processor such as the example memory controller 934 of FIG. 9. In other examples, the means for detecting errors is implemented by hardware logic, hardware implemented state machines, logic circuitry, and/or any other combination of hardware, software, and/or firmware.

Figure 3:
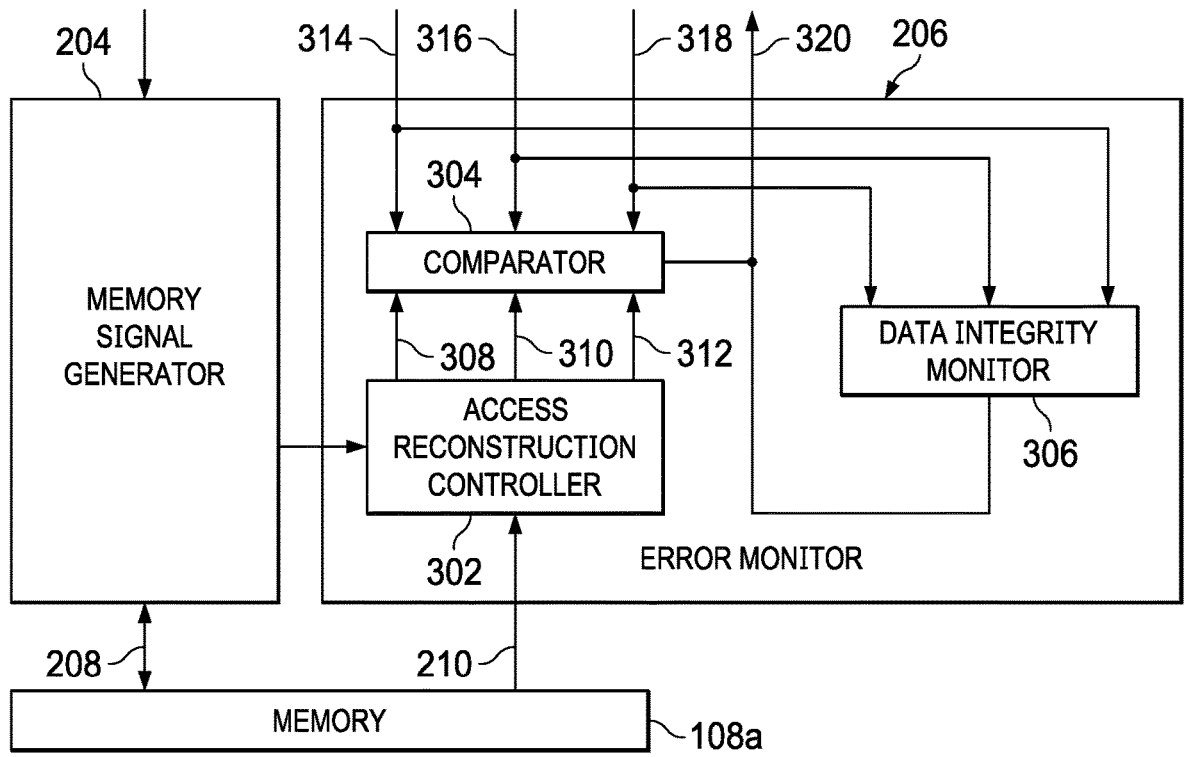
FIG. 3 is a block diagram showing additional detail of an error monitor of the first memory controller of FIGS. 1 and/or 2.

FIG. 3 is a block diagram showing additional detail of an error monitor 206 of the first memory controller 106a of FIGS. 1 and/or 2. In the example of FIG. 3, the error monitor 206 includes an example access reconstruction controller 302, an example comparator 304, and an example data integrity monitor 306. In the example of FIG. 3, the access reconstruction controller 302 includes first input terminals, second input terminals, and output terminals. In the example of FIG. 3, the comparator 304 includes first input terminals, second input terminals, and output terminals. In the example of FIG. 3, the data integrity monitor 306 includes input terminals and output terminals.

In the illustrated example of FIG. 3, the first input terminals of the access reconstruction controller 302 are coupled to the output terminals of the first memory 108a via the memory feedback bus 210 (e.g., the access reconstruction controller 302 is coupled to memory of the SoC 100). The output terminals of the access reconstruction controller 302 are coupled to first input terminals of the comparator 304 via an example inferred program bus 308, an example inferred data read bus 310, and an example inferred data write bus 312. The second input terminals of the access reconstruction controller 302 are coupled to the second output terminals of the memory signal generator 204. As used herein the term inferred bus (e.g., the inferred program bus 308, the inferred data read bus 310, the inferred data write bus 312, etc.) refers to a bus configured to carry AAC information reconstructed from an access to memory, based on an inferred purpose of the access to the memory. For example, the inferred data write bus 312 is configured to carry AAC information reconstructed from an access to the first memory 108a, when the inferred purpose of the access to the first memory 108a was to write data to the first memory 108a. The inferred purpose of the access to the memory is determined based on the feedback signal from the memory specifying whether the operation performed on the memory was a read or a write operation. For read operations, the access reconstruction controller 302 differentiates between program read operations and general read operations based on information received from the arbiter 202 (connection not illustrated).

In the illustrated example of FIG. 3, the access reconstruction controller 302 is implemented by logic (e.g., sequential logic and/or combinational logic). In additional or alternative examples, the access reconstruction controller 302 may be implemented by hardware, firmware, and/or software. In the example of FIG. 3, the access reconstruction controller 302 receives the feedback signals from the first memory 108a. Based on the feedback signals from the first memory 108a, the access reconstruction controller 302 reconstructs the memory AAC information for the current access to the first memory 108a. For example, the feedback signals from the first memory 108a include the memory enable signal, a recreated offset address (e.g., encoded in the first memory 108a from the word-lines and bit-lines that were energized during the access) and a write enable signal indicating whether a write operation or read operation occurred. Additionally, for write operations, the feedback signals include the data written to the first memory 108a and one or more byte enable signals that were energized during the write operation.

In the illustrated example of FIG. 3, the access reconstruction controller 302 reconstructs the memory address that is currently being accessed based on the address accessed in the first memory 108a. For example, the address accessed in the first memory 108a may be represented as one or more bit-lines and word-lines that are energized in the first memory 108a. The first memory 108a encodes the address accessed in the first memory 108a from the energized word-lines and bit-lines into the recreated offset address. The reconstruction controller 302 combines the recreated offset address with the base address of the first memory 108a. For example, the reconstructions controller 302 receives the base address of the first memory 108a from the memory signal generator 204. Additionally, for partial write operations, the access reconstruction controller 302 receives the ignored bits of the address and/or data from the memory signal generator 204. After reconstructing the address that is currently being accessed, the access reconstruction controller 302 transmits the reconstructed address to the comparator 304. In this manner, the error monitor 206 detects faults that occur when the address is generated by the memory signal generator 204.

Additionally or alternatively, the access reconstruction controller 302 determines whether a read or write occurred during the current access to the first memory 108a. For example, the access reconstruction controller 302 determines whether a read or write occurred based on a value of the write enable signal received in the feedback signals. In the example of FIG. 3, in response to determining that a read occurred, the access reconstruction controller 302 indicates to the comparator 304 that a read occurred. In response to determining that a write occurred, the access reconstruction controller 302 indicates to the comparator 304 that a write occurred.

In the illustrated example of FIG. 3, the access reconstruction controller 302 reconstructs the data written to the first memory 108a. For example, the access reconstruction controller 302 access the data written to the first memory 108a via a write-through feature of the first memory 108a that allows data written to the first memory 108a to be output from the first memory 108a at the next clock cycle. After obtaining and/or otherwise reconstructing the data written to memory, the access reconstruction controller 302 transmits the reconstructed data to the comparator 304. The access reconstruction controller 302 also determines the size of the data written to the first memory 108a. For example, the access reconstruction controller 302 determines the size of the data written to the first memory 108a based on the byte enable signals that are being energized during the access to the first memory 108a. The access reconstruction controller 302 transmits the size of the data to the comparator 304. In this manner, the error monitor 206 detects faults in control signals (e.g., control information) related to writes. For example, faults occurring the control information will result in incorrect outputs from the first memory 108a for the byte enable signals. The access reconstruction controller 302 also forwards the base address of the first memory 108a (e.g., received from the memory signal generator 204) to the comparator 304.

In the illustrated example of FIG. 3, the access reconstruction controller 302 transmits the value of the memory enable signal, the address of the first memory 108a that was operated on, the value of the write enable signal, the data written to the first memory 108a (for write operations), the size of the data written to the first memory 108a (for write operations), and/or the base address of the first memory 108a. For example, for program related read operations, the access reconstruction controller 302 transmits the value of the memory enable signal, the address of the first memory that was operated on, the value of the write enable signal, and the base address of the first memory 108a to the comparator 304 over the inferred program bus 308. For general read operations, the access reconstruction controller 302 transmits the value of the memory enable signal, the address of the first memory that was operated on, the value of the write enable signal, and the base address of the first memory 108a to the comparator 304 over the inferred data read bus 310. For write operations, the access reconstruction controller 302 transmits the value of the memory enable signal, the address of the first memory 108a that was operated on, the value of the write enable signal, the data written to the first memory 108a, the size of the data written to the first memory 108a, and the base address of the first memory 108a to the comparator 304 over the inferred data write bus 312.

In some examples, the example access reconstruction controller 302 implements example means for reconstructing memory access. The means for reconstructing memory access is implemented by executable instructions such as that implemented by at least blocks 502 and 518 of FIG. 5 and/or at least blocks 602, 604, 606, 608, 610, 612, 614, 616, and 618 of FIG. 6. The executable instructions of blocks 502 and 518 of FIG. 5 and/or blocks 602, 604, 606, 608, 610, 612, 614, 616, and 618 of FIG. 6 may be executed on at least one processor such as the example memory controller 934 of FIG. 9. In other examples, the means for reconstructing memory access is implemented by hardware logic, hardware implemented state machines, logic circuitry, and/or any other combination of hardware, software, and/or firmware.

In the illustrated example of FIG. 3, the comparator 304 is implemented by logic (e.g., sequential logic and/or combinational logic). In additional or alternative examples, the comparator 304 may be implemented by hardware, firmware, and/or software. In the example of FIG. 3, the first input terminals of the comparator 304 are coupled to the output terminals of the access reconstruction controller 302 via the inferred program bus 308, the inferred data read bus 310, and the inferred data write bus 312. The second input terminals of the comparator 304 are coupled to the second output terminals of the arbiter 202 via an example expected program bus 314, an example expected data read bus 316, and/or an example expected data write bus 318. The output terminals of the comparator 304 are coupled to the third input terminals of the arbiter 202 via an example confirmation channel 320. As used herein the term expected bus (e.g., the expected program bus 314, the expected data read bus 316, the expected data write bus 318, etc.) refers to a bus configured to carry AAC information received from a requesting bus master (e.g., via the arbiter 202, the first address decoder 104a, and/or the second address decoder 104b), based on the purpose of the access to the memory. For example, the expected data write bus 318 is configured to carry AAC information received from a requesting bus master, when the purpose of the request was to write data to the first memory 108a. As such, the arbiter 202 forwards the AAC information received from the requesting bus master on the first memory program bus 118a, the first memory data read bus 120a, and the first memory data write bus 122a to the comparator 304 and the data integrity monitor 306.

In the illustrated example of FIG. 3, the comparator 304 compares the reconstructed access and control information to the expected access and control information. For example, the comparator 304 receives the reconstructed access and control information on one or more of the inferred program bus 308, the inferred data read bus 310, and/or the inferred data write bus 312. Additionally, the comparator 304 receives the expected access and control information on one or more of the expected program bus 314, the expected data read bus 316, and/or the expected data write bus 318.

For example, the comparator 304 compares the reconstructed address to the expected address transmitted by the requesting bus master. Additionally or alternatively, the comparator 304 compares the value of a write enable signal received from the access reconstruction controller 302 to the expected write enable signal from the requesting bus master. For example, the comparator 304 determines the value of the expected write enable signal based on which of the expected program bus 314, the expected data read bus 316, or the expected data write bus 318 the comparator 304 received the expected AAC information. In this manner, the error monitor 206 detects faults in control signals (e.g., control information) related to writes. For example, faults occurring in the control information will result in incorrect outputs from the first memory 108a for the write enable signal. In some examples, the comparator 304 compares the reconstructed data that was and/or is being written to the first memory 108a to the expected data that was to be written to the first memory 108a. In this manner, the error monitor 206 detects faults in data being written to the first memory 108a. Additionally or alternatively, the comparator 304 compares reconstructed size of the data written to the first memory 108a to the size of the expected data that was to be written to the first memory 108a.

In the illustrated example of FIG. 3, if the comparator 304 detects a difference between the reconstructed access and control information and the expected access and control information, the comparator 304 transmits a non-maskable interrupt to the requesting bus master via the confirmation channel 320 (e.g., via the arbiter 202, the first address decoder 104a, and/or the second address decoder 104b). If the comparator 304 does not detect a difference between the reconstructed access and control information and the expected access and control information, the comparator 304 compares the actual base address of the first memory 108a to the expected base address. If the comparator 304 detects a difference between the actual base address of the first memory 108a and the expected base address, the comparator 304 transmits a non-maskable interrupt to the requesting bus master via the confirmation channel 320. In some examples disclosed herein, the comparator 304 performs comparisons via a one-to-one comparison.

In some examples, the example comparator 304 implements example means for comparing. The means for comparing is implemented by executable instructions such as that implemented by at least blocks 504, 506, 508, 510, and 520 of FIG. 5 and/or at least blocks 702, 704, 706, and 708 of FIG. 7. The executable instructions of blocks 504, 506, 508, 510, and 520 of FIG. 5 and/or blocks 702, 704, 706, and 708 of FIG. 7 may be executed on at least one processor such as the example memory controller 934 of FIG. 9. In other examples, the means for comparing is implemented by hardware logic, hardware implemented state machines, logic circuitry, and/or any other combination of hardware, software, and/or firmware.

In the illustrated example of FIG. 3, the data integrity monitor 306 is implemented by logic (e.g., sequential logic and/or combinational logic). In additional or alternative examples, the data integrity monitor 306 may be implemented by hardware, firmware, and/or software. The input terminals of the data integrity monitor 306 are coupled to the second output terminals of the arbiter 202 via the expected program bus 314, the expected data read bus 316, and/or the expected data write bus 318. The output terminals of the data integrity monitor 306 are coupled to the third input terminals of the arbiter 202 via the confirmation channel 320.

In the illustrated example of FIG. 3, the data integrity monitor 306 determines one or more parity bits for the expected access and control information transmitted on the expected program bus 314, the expected data read bus 316, and/or the expected data write bus 318. Based on the one or more parity bits, the data integrity monitor 306 determines whether any errors are present in the expected access and control information. Additionally or alternatively, the data integrity monitor 306 executes ECC for the expected access and control information transmitted on the expected program bus 314, the expected data read bus 316, and/or the expected data write bus 318 to check whether any errors are present in the expected access and control information. In this manner, the error monitor 206 detects faults that may occur in transit to the first memory controller 106a.

In the illustrated example of FIG. 3, if the data integrity monitor 306 determines that any errors are present in the expected access and control information, the data integrity monitor 306 transmits a non-maskable interrupt to the requesting bus master via the confirmation channel 320. If the data integrity monitor 306 determines that no errors are present in the expected access and control information, the data integrity monitor 306 transmits an acknowledgement to the requesting bus master via the confirmation channel 320.

In some examples, the example data integrity monitor 306 implements example means for monitoring data integrity. The means for monitoring data integrity is implemented by executable instructions such as that implemented by at least blocks 512, 514, 516, and 520 of FIG. 5. The executable instructions of blocks 512, 514, 516, and 520 of FIG. 5 may be executed on at least one processor such as the example memory controller 934 of FIG. 9. In other examples, the means for monitoring data integrity is implemented by hardware logic, hardware implemented state machines, logic circuitry, and/or any other combination of hardware, software, and/or firmware.

Figure 4:
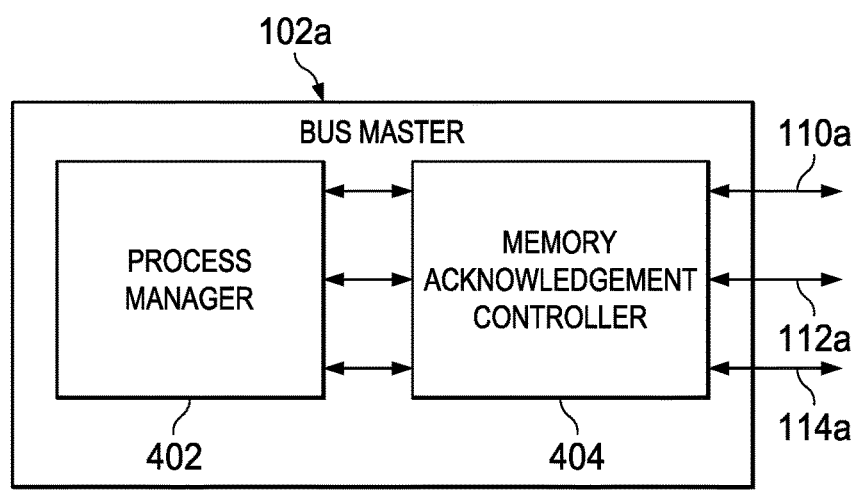
FIG. 4 is a block diagram showing additional detail of a first bus master of FIG. 1.

FIG. 4 is a block diagram showing additional detail of a first bus master 102a of FIG. 1. The first bus master 102a includes an example process manager 402 and an example memory acknowledgement controller 404. In the example of FIG. 4, the process manager 402 includes dual purpose terminals. In the example of FIG. 4, the memory acknowledgement controller 404 includes first dual purpose terminals and second dual purpose terminals. In the example of FIG. 4, the dual purpose terminals of the process manager 402 are coupled to the first dual purpose terminals of the memory acknowledgement controller 404. In the example of FIG. 4, the second dual purpose terminals of the memory acknowledgement controller 404 are coupled to the dual purpose terminals of the first address decoder 104a via the program bus 110a, the data read bus 112a, and the data write bus 114a.

In the illustrated example of FIG. 4, the process manager 402 is implemented by a control unit and/or a processor. In additional or alternative examples, the process manager 402 may be implemented by hardware, firmware, and/or software. In the example of FIG. 4, the process manager 402 executes instructions to perform operations at the SoC 100. For example, the process manager 402 may execute instructions and/or perform operations related to a vehicle control system (e.g., an electronic control unit (ECU)).

In the illustrated example of FIG. 4, the process manager 402 generates access and control information to access memory (e.g., the first memory 108a and/or the second memory 108b) associated with one or more operations of the process manager 402. The process manager 402 monitors the memory acknowledgement controller 404 for the data accessed from memory, an acknowledgement that the access to memory was successful, and/or an interrupt indicating the access to memory failed. For example, the lack of an acknowledgement is indicative that the access to the memory resulted in an error. In response to detecting an interrupt indicating the access to memory failed, the process manager 402 executes one or more operations to handle the error. For example, if the error relates to a safety-related feature, the operations to handle the error may be to alert an operator of the vehicle in which the SoC 100 is included to the error. If an acknowledgement is received from the memory, the process manager 402 executes additional operations related to the vehicle control system.

In some examples, the example process manager 402 implements example means for managing processes. The means for managing processes is implemented by executable instructions such as that implemented by at least blocks 802, 808, and 810 of FIG. 8. The executable instructions of blocks 802, 808, and 810 of FIG. 8 may be executed on at least one processor such as the example processor 912 and/or the accelerator 936 of FIG. 9. In other examples, the means for managing processes is implemented by hardware logic, hardware implemented state machines, logic circuitry, and/or any other combination of hardware, software, and/or firmware.

In the illustrated example of FIG. 4, the memory acknowledgement controller 404 is implemented by logic (e.g., sequential logic and/or combinational logic). In additional or alternative examples, the memory acknowledgement controller 404 may be implemented by hardware, firmware, and/or software. In the example of FIG. 4, the memory acknowledgement controller 404 forwards access and control information from the process manager 402 to the first address decoder 104a. Additionally or alternatively, the memory acknowledgement controller 404 monitors one or more of the program bus 110a, the data read bus 112a, and/or the data write bus 114a for an acknowledgment that the access to the memory was successful. In this manner, the memory acknowledgement controller 404 detects any faults occurring at the arbiter 202 and/or faults that may result in the address decoders 104 and/or the memory controllers 106 failing to transmit access and control information further downstream to facilitate access to the memories 108.

In some examples, the example memory acknowledgment controller 404 implements example means for checking acknowledgment. The means for checking acknowledgment is implemented by executable instructions such as that implemented by at least blocks 804 and 806 of FIG. 8. The executable instructions of blocks 804 and 806 of FIG. 8 may be executed on at least one processor such as the example processor 912 and/or the accelerator 936 of FIG. 9. In other examples, the means for checking acknowledgment is implemented by hardware logic, hardware implemented state machines, logic circuitry, and/or any other combination of hardware, software, and/or firmware.

While an example manner of implementing the error monitor 206 of FIG. 2 is illustrated in FIG. 3 and an example manner of implementing the first bus master 102a of FIG. 1 is illustrated in FIG. 4, one or more of the elements, processes and/or devices illustrated in FIGS. 3 and/or 4 may be combined, divided, re-arranged, omitted, eliminated and/or implemented in any other way. Further, the example access reconstruction controller 302, the example comparator 304, the example data integrity monitor 306, and/or, more generally, the example error monitor 206 of FIGS. 2 and/or 3 and/or the example process manager 402, the example memory acknowledgement controller 404, and/or, more generally, the example bus master 102a of FIGS. 1 and/or 4 may be implemented by hardware, software, firmware and/or any combination of hardware, software and/or firmware. Thus, for example, any of the example access reconstruction controller 302, the example comparator 304, the example data integrity monitor 306, and/or, more generally, the example error monitor 206 of FIGS. 2 and/or 3 and/or the example process manager 402, the example memory acknowledgement controller 404, and/or, more generally, the example bus master 102a of FIGS. 1 and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example access reconstruction controller 302, the example comparator 304, the example data integrity monitor 306, and/or, more generally, the example error monitor 206 of FIGS. 2 and/or 3 and/or the example process manager 402, the example memory acknowledgement controller 404, and/or, more generally, the example bus master 102*a* of FIGS. 1 and/or 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example error checker 206 of FIGS. 2 and/or 3 and/or the example first bus master 102*a* of FIGS. 1 and/or 4 may include one or more elements, processes and/or devices in addition to, or instead of, those illustrated in FIGS. 3 and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
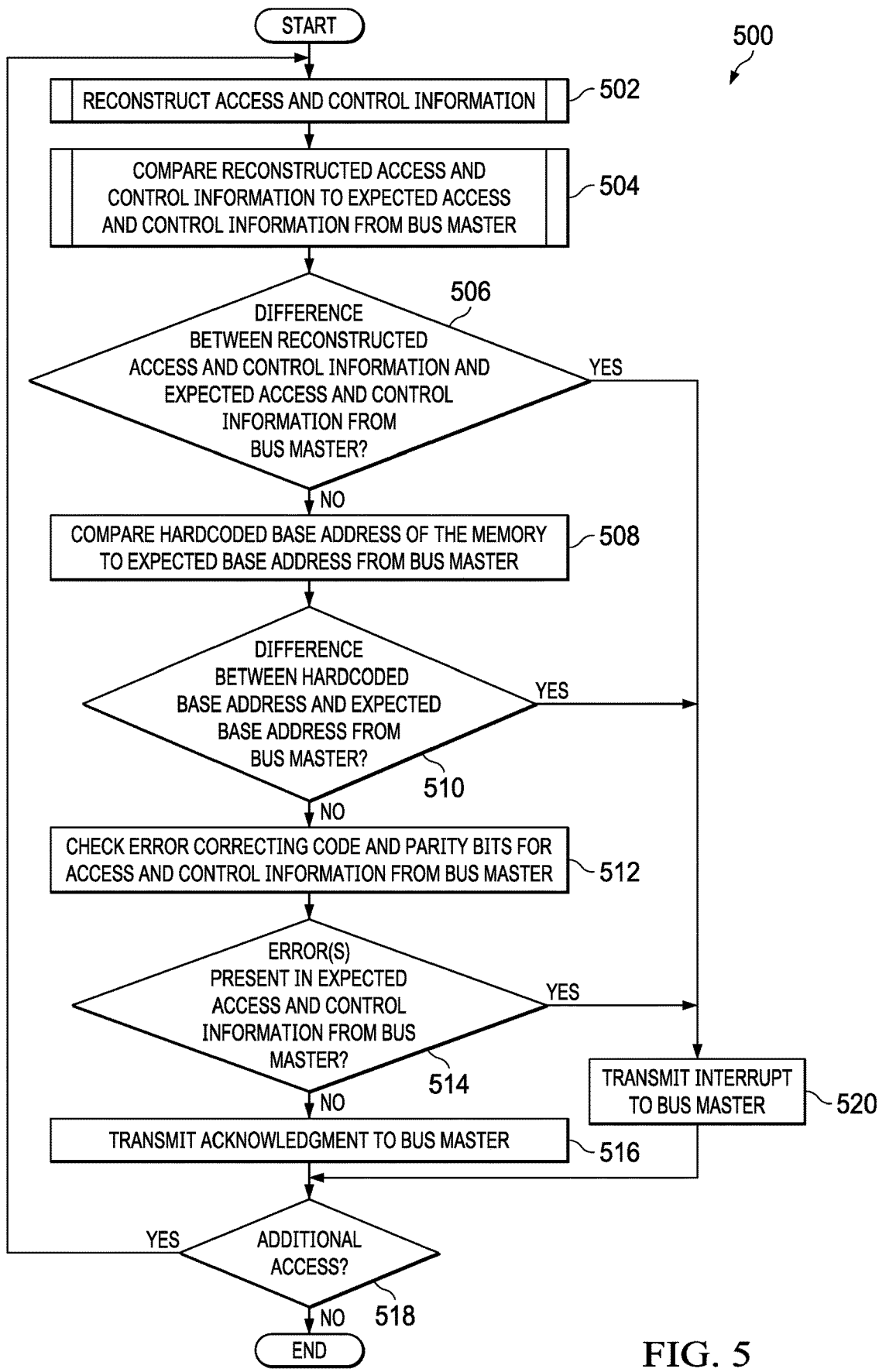
FIG. 5 is a flowchart representative of an example process which may be implemented by hardcoded logic such as the error monitor of FIGS. 2 and/or 3 and/or, more generally, the first memory controller of FIGS. 1 and/or 2 to check for errors in a memory access.
Figure 6:
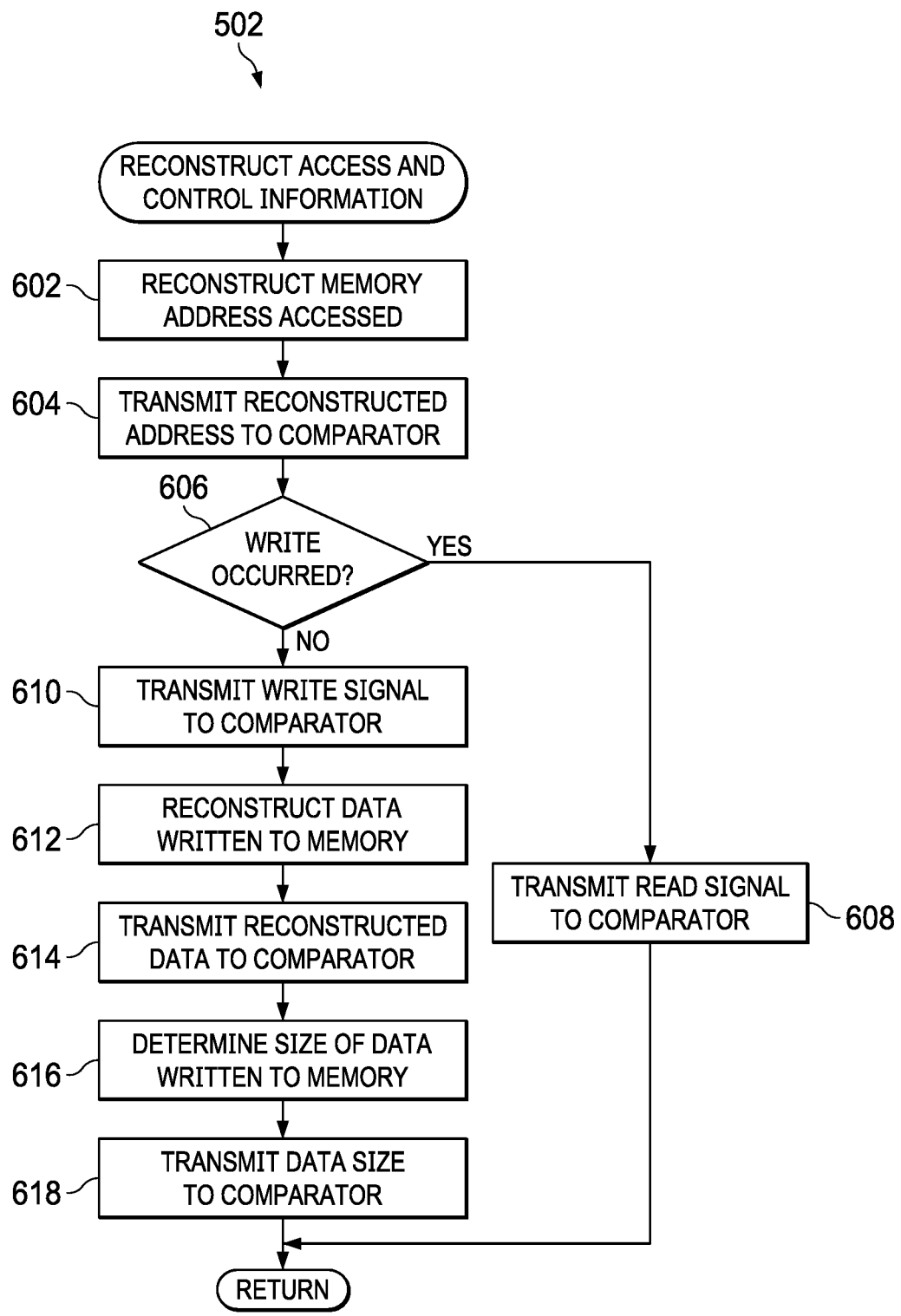
FIG. 6 is a flowchart representative of an example subprocess which may be implemented by hardcoded logic such as the error monitor of FIGS. 2 and/or 3, and/or, more generally, the first memory controller of FIGS. 1 and/or 2 to reconstruct access and control information.

Flowcharts representative of example hardware logic, machine-readable instructions, hardware implemented state machines, and/or any combination thereof for implementing the error monitor 206 of FIGS. 2 and/or 3 are shown in FIGS. 5, 6, and/or 7. The machine-readable instructions may be one or more executable programs or portion(s) of an executable program for execution by a computer processor and/or processor circuitry, such as the memory controller 934 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the memory controller 934, but the entire program and/or parts thereof could alternatively be executed by a device other than the memory controller 934 and/or embodied in firmware or dedicated hardware. Further, although the example program is described with reference to the flowcharts illustrated in FIGS. 5, 6, and/or 7, many other methods of implementing the example error monitor 206 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 8:
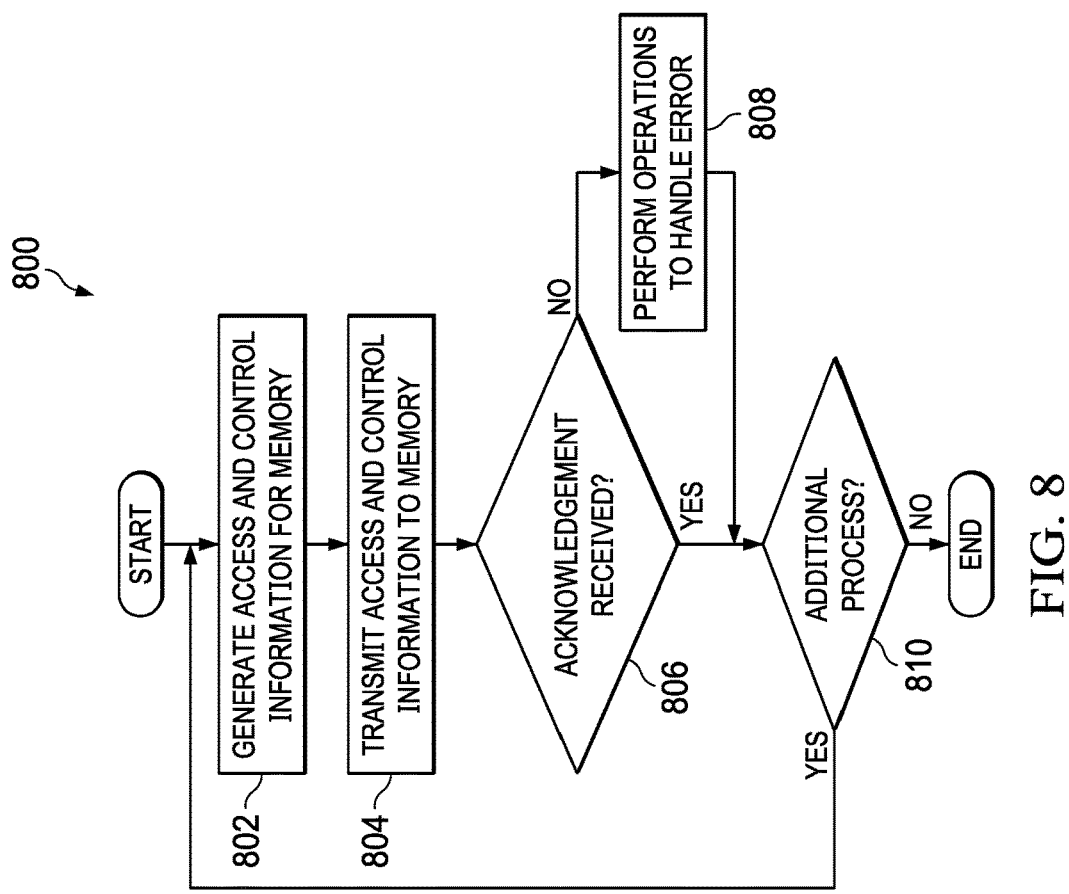
FIG. 8 is a flowchart representative of machine-readable instructions which may be executed to implement the first bus master of FIGS. 1 and/or 4 to check for an acknowledgement after requesting access to memory.

A flowchart representative of example hardware logic, machine-readable instructions, hardware implemented state machines, and/or any combination thereof for implementing the first bus master 102*a* of FIGS. 1 and/or 4 is shown in FIG. 8. The machine-readable instructions may be one or more executable programs or portion(s) of an executable program for execution by a computer processor and/or processor circuitry, such as the processor 912 and/or the accelerator 936 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912 and/or the accelerator 936, but the entire program and/or parts thereof could alternatively be executed by a device other than the processor 912 and/or the accelerator 936 and/or embodied in firmware or dedicated hardware. Further, although the example program is described with reference to the flowchart illustrated in FIG. 8, many other methods of implementing the example first bus master 102*a* may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5, 6, 7, and/or 8 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of an example process 500 which may be implemented by hardcoded logic such as the error monitor 206 of FIGS. 2 and/or 3 and/or, more generally, the first memory controller 106a of FIG. 1 and/or 2 to check for errors in a memory access. In some examples, the process 500 may be implemented by a processor executing machine readable instructions to implement the error monitor 206 of FIGS. 2 and/or 3 and/or, more generally, the first memory controller 106a of FIGS. 1 and/or 2. The process 500 begin at block 502 where the access reconstruction controller 302 reconstructs the access and control information for the current access to the first memory 108a based on one or more feedback signals from the first memory 108a. For example, the access reconstruction controller 302 reconstructs the access and control information for the current access based on a memory enable signal, the offset address at which the data that was operated on is stored, a write enable signal indicating whether a read or write occurred, byte enable signals, and/or the data written to memory. A detailed sub-process to reconstruct the access and control information for the current access to the first memory 108a is illustrated and described in connection with FIG. 6.

In the illustrated example of FIG. 5, at block 504, the comparator 304 compares the reconstructed access and control information to the expected access and control information from the bus master that requested access to the first memory 108a. For example, the comparator 304 compares the reconstructed access and control information to access and control information expected based on a request from a bus master to access the memory, where the request is made via one or more of the arbiter 202, the first address decoder 104a, or the second address decoder 104b. A detailed sub-process to compare the reconstructed access and control information to the expected access and control information from the bus master that requested access to the first memory 108a is illustrated and described in connection with FIG. 7. In the example of FIG. 5, at block 506, the comparator 304 determines whether there are differences between the reconstructed access and control information and the expected access and control information from the bus master that requested access to the first memory 108a.

In the illustrated example of FIG. 5, if the comparator 304 detects a difference between the reconstructed access and control information and the expected access and control information (block 506: YES), the process 500 proceeds to block 520. If the comparator 304 does not detect a difference between the reconstructed access and control information and the expected access and control information (block 506: NO), the process 500 proceeds to block 508. At block 508, the comparator 304 compares the hardcoded base address of the first memory 108a to the expected base address from the bus master that requested access to the first memory 108a.

In the illustrated example of FIG. 5, at block 510, the comparator 304 determines whether there are any differences between the hardcoded base address of the first memory 108a to the expected base address from the bus master. If the comparator 304 detects a difference between the hardcoded base address of the first memory 108a to the expected base address from the bus master (block 510: YES), the process 500 proceeds to block 520. If the comparator 304 does not detect any differences between the hardcoded base address of the first memory 108a to the expected base address from the bus master (block 510: NO), the process 500 proceeds to block 512.

In the illustrated example of FIG. 5, at block 512, the data integrity monitor 306 checks ECC and parity bits for the expected address, data, and control information received from the bus master requesting access to the first memory 108a. For example, the data integrity monitor 306 is configured to check error correcting code and parity bits for the expected address, data, and control information received from the bus master requesting access to the first memory 108a. At block 514, the data integrity monitor 306 determines whether any errors are present in the expected access and control information from the bus master requesting access to the first memory 108a. If the data integrity monitor 306 determines that any errors are present in the expected access and control information (block 514: YES), the process 500 proceeds to block 520.

In the illustrated example of FIG. 5, if the data integrity monitor 306 determines that no errors are present in the expected access and control information (block 514: NO), the process 500 proceeds to block 516. At block 516, the data integrity monitor 306 transmits an acknowledgement to the bus master that requested access to the first memory 108a. At block 518, the access reconstruction controller 302 determines whether there has been an additional access to the first memory 108a. If the access reconstruction controller 302 determines that an additional access has occurred (block 518: YES), the process 500 returns to block 502.

In the illustrated example of FIG. 5, if the access reconstruction controller 302 determines that no additional access has occurred (block 518: NO), the process 500 terminates. For example, the access reconstruction controller 302 may monitor the first memory 108a for a threshold period. If no access occurs during the threshold period, the error monitor 206 ceases operation (e.g., sleeps). If an access to the first memory 108a occurs while the error monitor 206 is asleep, the error monitor 206 will wake up and resume operation at block 502. At block 520, at least one of the comparator 304 or the data integrity monitor 306 transmits a non-maskable interrupt to the bus master that requested access to the first memory 108a.

FIG. 6 is a flowchart representative of an example sub-process of block 502 which may be implemented by hard-coded logic such as the error monitor 206 of FIGS. 2 and/or 3, and/or, more generally, the first memory controller 106a of FIGS. 1 and/or 2 to reconstruct access and control information. In some examples, the sub-process of block 502 may be implemented by a processor executing machine readable instructions to implement the error monitor 206 of FIGS. 2 and/or 3 and/or, more generally, the first memory controller 106a of FIGS. 1 and/or 2. The sub-process of block 502 begins at block 602 where the access reconstruction controller 302 reconstructs the memory address that is currently being and/or was accessed based on the address accessed in the first memory 108a. For example, the first memory 108a encodes an offset address accessed in the first memory 108a from the word-lines and bit-lines that are energized while the first memory 108a is accessed and, at block 602, the access reconstruction controller 302 adds the offset address to a base address of the first memory 108a that is hardcoded at the first memory controller 106a to reconstruct the memory address that is currently being accessed. At block 604, the access reconstruction controller 302 transmits the reconstructed address to the comparator 304.

In the illustrated example of FIG. 6, at block 606, the access reconstruction controller 302 determines whether a read or write occurred during the current access to the first memory 108a. For example, at block 606, the access reconstruction controller 302 determines whether a read or write occurred based on a value of the write enable signal received in the feedback signals. In response to the access reconstruction controller 302 determining that a read occurred (block 606: YES), the sub-process of block 502 proceeds to block 608. At block 608, the access reconstruction controller 302 transmits a read signal to the comparator 304. After block 608, the sub-process of block 502 returns to the process 500 at block 504.

In the illustrated example of FIG. 6, in response to the access reconstruction controller 302 determining that a write occurred (block 606: YES), the sub-process of block 502 proceeds to block 610. At block 610, the access reconstruction controller 302 transmits a write signal to the comparator 304. At block 612, the access reconstruction controller 302 reconstructs the data written to the first memory 108a. For example, at block 612, the access reconstruction controller 302 obtains the data written to the first memory 108a via a write-through feature of the first memory 108a.

In the illustrated example of FIG. 6, at block 614, the access reconstruction controller 302 transmits the reconstructed data to the comparator 304. At block 616, the access reconstruction controller 302 determines the size of the data written to the first memory 108a. For example, at block 616, the access reconstruction controller 302 determines the size of the data written to the first memory 108a based on the byte enable signals that are being and/or were energized during the access to the first memory 108a. At block 618, the access reconstruction controller 302 transmits the size of the data to the comparator 304. After block 618, the sub-process of block 502 returns to the process 500 at block 504.

Figure 7:
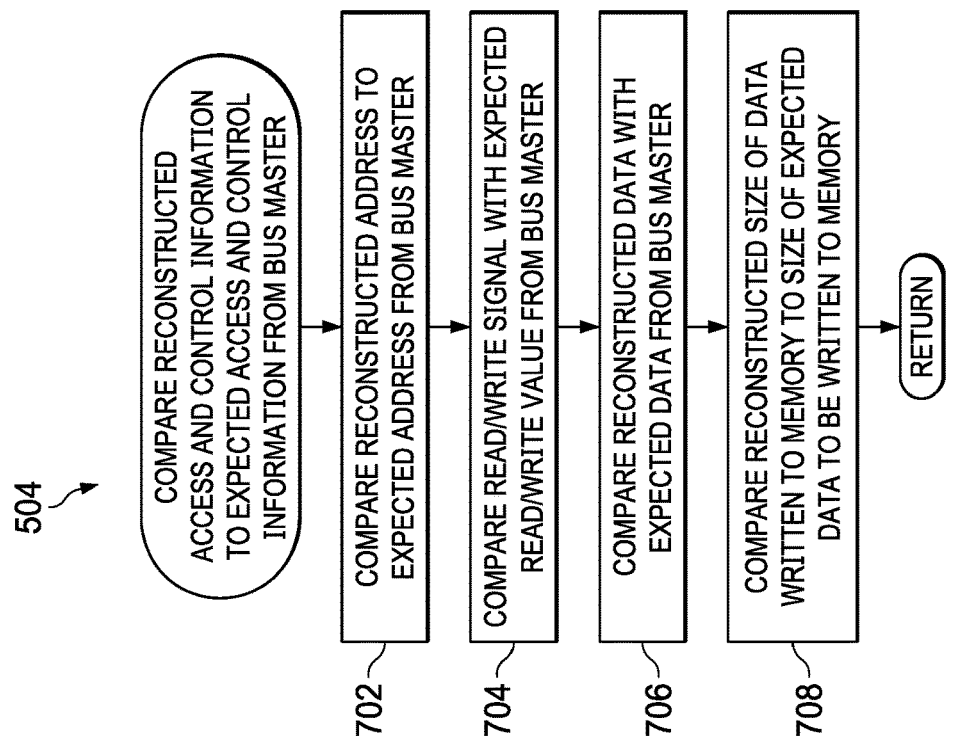
FIG. 7 is a flowchart representative of an example subprocess which may be implemented by hardcoded logic such as the error monitor of FIGS. 2 and/or 3, and/or, more generally, the first memory controller of FIGS. 1 and/or 2 to compare reconstructed access and control information to expected access and control information.

FIG. 7 is a flowchart representative of an example sub-process of block 504 which may be implemented by hard-coded logic such as the error monitor 206 of FIGS. 2 and/or 3, and/or, more generally, the first memory controller 106a of FIGS. 1 and/or 2 to compare reconstructed access and control information to expected access and control information. In some examples, the sub-process of block 504 may be implemented by a processor executing machine readable instructions to implement the error monitor 206 of FIGS. 2 and/or 3 and/or, more generally, the first memory controller 106a of FIGS. 1 and/or 2. The sub-process of block 504 begins at block 702 where the comparator 304 compares the reconstructed address to the expected address transmitted by the bus master that requested access to the first memory 108a. At block 704, the comparator 304 compares the value of a write enable signal received from the access reconstruction controller 302 to the expected write enable signal from the bus master that requested access to the first memory 108a. For example, at block 704, the comparator 304 determines the value of the expected write enable signal based on which of the expected program bus 314, the expected data read bus 316, or the expected data write bus 318 the comparator 304 received the expected AAC information.

In the illustrated example of FIG. 7, at block 706, the comparator 304 compares the reconstructed data that was and/or is being written to the first memory 108a to the expected data that was to be written to the first memory 108a. At block 708, the comparator 304 compares reconstructed size of the data written to the first memory 108a to the size of the expected data that was to be written to the first memory 108a. After block 708, the sub-process of block 504 returns to the process 500 at block 506.

FIG. 8 is a flowchart representative of machine-readable instructions 800 which may be executed to implement the first bus master 102a of FIGS. 1 and/or 4 to check for an acknowledgement after requesting access to memory. The machine-readable instructions 800 begin at block 802 where the process manager 402 generates access and control information to access memory (e.g., the first memory 108a and/or the second memory 108b). At block 804, the memory acknowledgement controller 404 transmits the access and control information to the first address decoder 104a to be forwarded to the requested memory.

In the illustrated example of FIG. 8, at block 806, the memory acknowledgement controller 404 determines whether an acknowledgement has been received. For example, at block 806, the memory acknowledgement controller 404 monitors for an acknowledgment for a threshold amount of time. If the memory acknowledgment controller 404 determines that the first bus master 104a has not received an acknowledgement (block 806: NO), the machine-readable instructions 800 proceed to block 808. If the memory acknowledgment controller 404 determines that the first bus master 104a has received an acknowledgement (block 806: YES), the machine-readable instructions 800 proceed to block 810.

In the illustrated example of FIG. 8, at block 808, after the first bus master 102a has not received an acknowledgement, indicating that the requested access to memory failed and/or otherwise resulted in an error, the process manager 402 executes one or more operations to handle the error. At block 810, the process manager 402 determines whether there are additional processes to be executed. In response to the process manager 402 determining that there are additional processes to be executed (block 810: YES), the machine-readable instructions 800 return to block 802. In response to the process manager 402 determining that there are not additional processes to be executed (block 810: NO), the machine-readable instructions 800 terminate.

Figure 9:
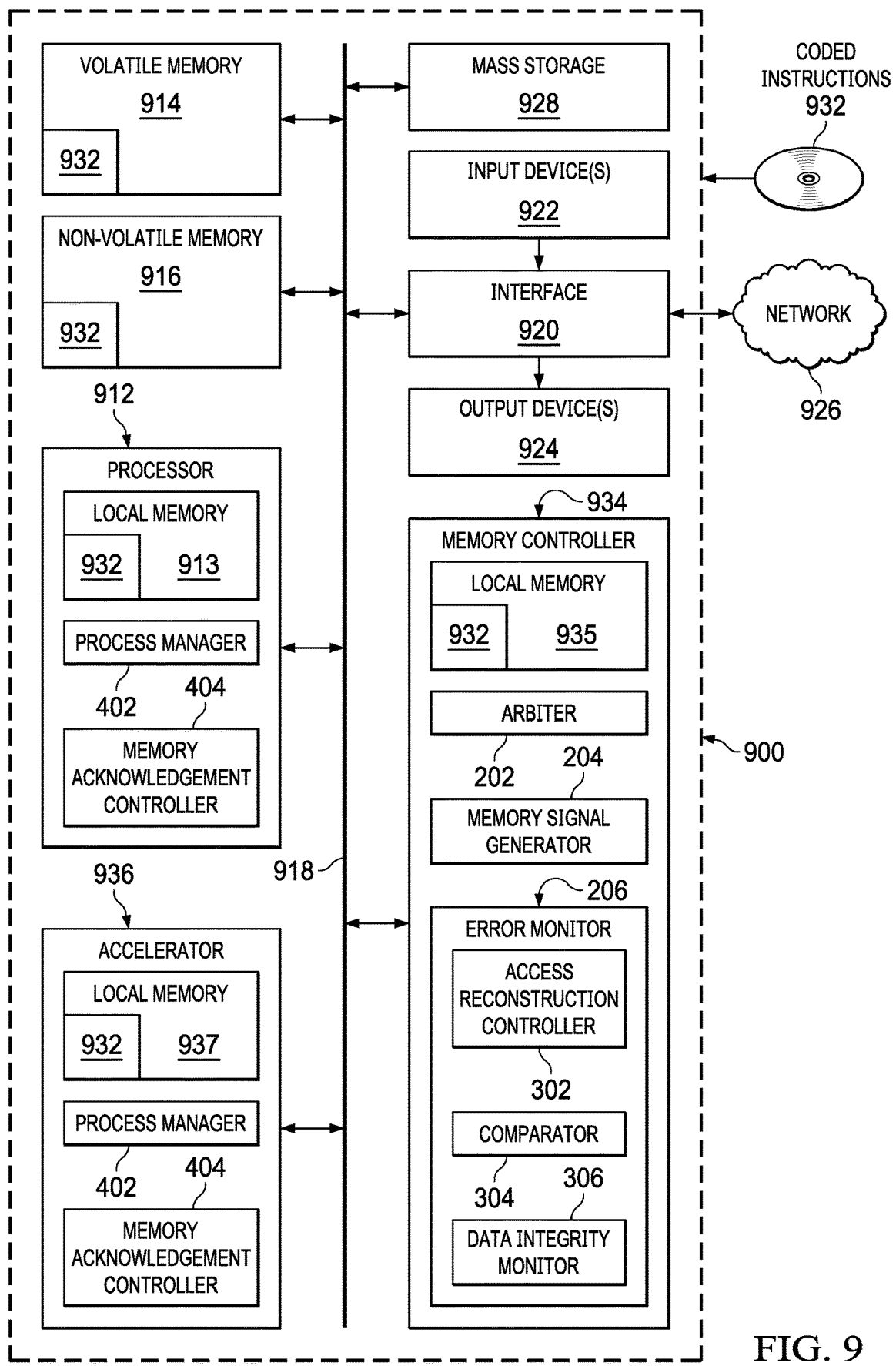
FIG. 9 is a block diagram of an example processing platform structured to execute the process of FIGS. 5, 6, and/or 7 to implement the error monitor of FIGS. 2 and/or 3, and/or, more generally, the first memory controller of FIGS. 1 and/or 2, and/or to execute the instructions of FIG. 8 to implement the first bus master of FIGS. 1 and/or 4.

FIG. 9 is a block diagram of an example processing platform 900 structured to execute the process 500 of FIGS. 5, 6, and/or 7 to implement the error monitor 206 of FIGS. 2 and/or 3, and/or, more generally, the first memory controller 106a of FIGS. 1 and/or 2, and/or to execute the machine-readable instructions 800 of FIG. 8 to implement the first bus master 102a of FIGS. 1 and/or 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example process manager 402 and the example memory acknowledgement controller 404.

The processor platform 900 of the illustrated example includes a memory controller 934. The memory controller 934 of the illustrated example is hardware. For example, the memory controller 934 can be implemented by one or more integrated circuits, logic circuits, microprocessors, or controllers from any desired family or manufacturer. For example, the memory controller 934 can be implemented by one or more IMCs, one or more MCCs, one or more MCUs, and/or one or more MMUs. The hardware memory controller 934 may be a semiconductor based (e.g., silicon based) device. In this example, the memory controller 934 implements the example arbiter 202, the example memory signal generator 204, the example access reconstruction controller 302, the example comparator 304, the example data integrity monitor 306, and/or, more generally, the example error monitor 206.

The processor platform 900 of the illustrated example includes an accelerator 936. The accelerator 936 of the illustrated example is hardware. For example, the accelerator 936 can be implemented by one or more integrated circuits, logic circuits, microprocessors, GPUs, DSPs, or controllers from any desired family or manufacturer. For example, the accelerator 936 can be implemented by one or more CLAs, one or more FPUs, one or more FINTDIV units, one or more TMUs, one or more VCUs, one or more BGCRC units, and/or one or more EMACs. The hardware accelerator 936 may be a semiconductor based (e.g., silicon based) device. In this example, the accelerator 936 implements the example process manager 402 and the example memory acknowledgement controller 404.

The processor 912, the memory controller 934, and the accelerator 936 of the illustrated example include a local memory 913, a local memory 935, and a local memory 937, respectively (e.g., a cache). The processor 912, the memory controller 934, and the accelerator 936 of the illustrated example are in communication with a main memory including a volatile memory 914 and a non-volatile memory 916 via a bus 918. The volatile memory 914 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 916 may be implemented by flash memory and/or any other desired type of memory device. Access to the main memory 914, 916 is controlled by a memory controller (e.g., the memory controller 934).

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912, the memory controller 934, and the accelerator 936. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 9 may implement the process 500 of FIGS. 5, 6, and/or 7 and/or the machine-readable instructions 800 of FIG. 8. The machine executable instructions 932 may be stored in the mass storage device 928, in the volatile memory 914, in the non-volatile memory 916, and/or on a removable non-transitory computer readable storage medium such as a CD or DVD.

Examples disclosed herein include an error monitor that interprets what accesses to memory resulted from an operation (e.g., reconstructed access and control information) and compare the access to memory resulted from the operation to access and control information from a requesting bus master (e.g., expected access and control information). For example, the error monitor interprets what access to memory resulted from an operation based on feedback signals (e.g., critical signal information) output from the memory. For example, critical signal information includes at least the memory enable signal, the address being accessed in memory (e.g., the offset address encoded from the energized bit-lines and word-lines), data being written to memory, the write enable signal, and the byte enable signals.

The example error monitor disclosed herein additionally performs a base address check to detect errors that occur at address decoders. Thus, examples disclosed herein eliminate the need to duplicate address decoders. Additionally or alternatively, examples disclosed herein perform an acknowledgement check at the requesting bus master to detect total loss of access to the requested memory. As such, examples disclosed herein enable next generation SoC architecture that satisfy higher safety standards (e.g., ASIL D).

Examples disclosed herein eliminate the need to stores address ECC and parity in memory. For example, for 32 bits of data, typical memories store 7 bits of ECC and parity for every 16 bits of data plus an additional 7 bits of ECC and parity for the address of the data. Because examples disclosed herein perform comparisons as the memory is accessed, the ECC and parity bits for the address of data need not be stored in memory. By eliminating the need to store ECC and parity bits for the address of data, examples disclosed herein reduce the physical area consumed by an SoC. For example, examples disclosed herein reduce the physical area of SoCs by 14%. Accordingly, examples disclosed herein reduce the physical area consumed by an SoC and reduces the timing complexity for the SoC. For example, the reduced area allows for higher frequency operation at the SoC (e.g., increases the frequency of operation of the SoC). As such, examples disclosed herein increase the frequency of operation of the SoC.

From the foregoing, it will be appreciated that example methods, apparatus and articles of manufacture have been disclosed that determine memory access integrity based on feedback from memory. The disclosed methods, apparatus and articles of manufacture improve the efficiency of using a computing device by reducing the physical area consumed by SoCs (e.g., footprint size) and increasing the frequency of operation of SoCs. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
receiving an operation directed to a memory, wherein the operation is associated with a first memory address;
causing the memory to perform the operation;
based on the memory performing the operation, receiving from the memory a second memory address associated with the performing of the operation;
comparing the first memory address associated with the operation as received to the second memory address associated with the operation as performed by the memory; and
determining whether an error occurred with respect to the operation based on the comparing of the first memory address to the second memory address.

2. The method of claim 1, wherein:
the operation specifies a first set of data to be written to the memory; the method further comprising:
based on the memory performing the operation, receiving from the memory a second set of data written to the memory;
comparing the first set of data associated with the operation as received to the second set of data associated with the operation as performed by the memory; and
determining whether the error occurred further based on the comparing of the first set of data to the second set of data.

3. The method of claim 1 further comprising:
based on the memory performing the operation, receiving from the memory a read/write indicator; and
determining whether the error occurred further based on the read/write indicator.

4. The method of claim 1 further comprising:
based on the memory performing the operation, receiving from the memory a set of byte enables; and
determining whether the error occurred further based on the set of byte enables.

5. The method of claim 4, wherein:
the operation is associated with a set of data having a first size; and
the determining of whether the error occurred based on the set of byte enables includes:
determining a second size of the set of data based on the set of byte enables; and
comparing the first size of the set of data with the second size of the set of data.

6. The method of claim 1, wherein:
the first memory address includes a first base address;
the receiving of the operation and the causing the memory to perform the operation are performed by a memory controller coupled to the memory;
the memory controller is associated with a second base address; and the method further comprises:
  comparing the first base address associated with the operation with the second base address associated with the memory controller; and
  determining whether the error occurred further based on the comparing of the first base address with the second base address.

7. The method of claim 1 further comprising:
receiving a first set of error information that includes at least one of: error correcting code or parity data that is associated with the operation;
determining a second set of error information includes at least one of: error correcting code or parity data that is based on the operation as performed by the memory;
comparing the first set of error information to the second set of error information associated with the operation as performed by the memory; and
determining whether the error occurred further based on the comparing of the first set of error information to the second set of error information.

8. The method of claim 7, wherein the first set of error information is associated with the first memory address and the second set of error information is determined based on the second memory address.

9. The method of claim 7, wherein:
the operation specifies a first set of data to be written to the memory;
the method further comprises, based on the memory performing the operation, receiving from the memory a second set of data written to the memory;
the first set of error information is associated with the first set of data; and
the second set of error information is determined based on the second set of data.

10. A device comprising:
a memory controller that includes:
  a signal generator; and
  an error monitor coupled to the signal generator; and
a memory coupled to the memory controller, wherein:
the memory controller is configured to:
  receive an operation associated with, and specified at least in part by, a first property;
  cause, using the signal generator, the memory to perform the operation;
  receive, by the error monitor, a set of feedback signals from the memory associated with the memory performing the operation;
  determine, using the error monitor, a second property associated with the operation as performed by the memory based on the set of feedback signals;
  compare, using the error monitor, the first property associated with the operation as received to the second property associated with the operation as performed by the memory; and
  determine, using the error monitor, whether an error occurred with respect to the operation based on the comparison of the first property to the second property.

11. The device of claim 10, wherein the first property includes a first memory address and the second property includes a second memory address.

12. The device of claim 10, wherein:
the first property includes a first set of data specified by the operation to be written to the memory;
the set of feedback signals specifies a second set of data written to the memory; and
the second property includes the second set of data.

13. The device of claim 10, wherein:
the first property includes whether the operation specifies a write to the memory;
the set of feedback signals specifies whether data was written to the memory; and
the second property includes whether data was written to the memory.

14. The device of claim 10, wherein:
the set of feedback signals specifies a set of byte enables of the memory; and
the second property is based on the set of byte enables.

15. The device of claim 14, wherein:
the first property includes a size of a first set of data associated with the operation;
the memory controller is further configured to determine, using the error monitor a size of a second set of data written to the memory based on the set of byte enables; and
the second property includes the size of the second set of data.

16. The device of claim 10, wherein:
the operation is associated with a first base address;
the memory controller is associated with a second base address; and
the memory controller is further configured to:
  compare the first base address associated with the operation with the second base address associated with the memory controller; and
  determine, using the error monitor, whether an error occurred with respect to the operation based on the comparison of the first base address with the second base address.

17. The device of claim 10, wherein the memory controller is further configured to:
receive a first set of error information that includes at least one of: error correcting code or parity data that is associated with the operation;
determine a second set of error information includes at least one of: error correcting code or parity data that is based on the operation as performed by the memory;
compare the first set of error information to the second set of error information associated with the operation as performed by the memory; and
determine, using the error monitor, whether an error occurred based on the comparison of the first set of error information to the second set of error information.

18. The device of claim 17, wherein:
the operation is associated with a first memory address;
the first set of error information is associated with the first memory address;
the set of feedback signals specifies a second memory address; and
the second set of error information is associated with the second memory address.

19. The device of claim 17, wherein:
the operation specifies a first set of data to be written to the memory;
the first set of error information is associated with the first set of data;
the set of feedback signals specifies a second set of data written to the memory; and
the second set of error information is associated with the second set of data.

* * * * *